US012557942B2

(12) United States Patent
Johnson et al.

(10) Patent No.: US 12,557,942 B2
(45) Date of Patent: Feb. 24, 2026

(54) DUAL MODE SOLID FUEL GRILLING APPLIANCE

(71) Applicant: Dansons US, LLC, Scottsdale, AZ (US)

(72) Inventors: Justin Johnson, Scottsdale, AZ (US); Perini Divya D. Valla Malla, Scottsdale, AZ (US)

(73) Assignee: DANSONS US, LLC, Scottsdale, AZ (US)

( * ) Notice: Subject to any disclaimer, the term of this patent is extended or adjusted under 35 U.S.C. 154(b) by 461 days.

(21) Appl. No.: 18/107,141

(22) Filed: Feb. 8, 2023

(65) Prior Publication Data

US 2024/0260787 A1 Aug. 8, 2024

(51) Int. Cl.
| | |
|---|---|
| *A47J 37/07* | (2006.01) |
| *F24B 1/187* | (2006.01) |
| *F24B 13/04* | (2006.01) |
| *F24B 15/00* | (2006.01) |

(52) U.S. Cl.
CPC ............. *A47J 37/079* (2013.01); *F24B 1/187* (2013.01); *F24B 13/04* (2013.01); *F24B 15/005* (2013.01)

(58) Field of Classification Search
CPC ... A47J 37/0754; A47J 37/079; F24B 15/005; F24B 13/04; F24B 1/187
See application file for complete search history.

(56) References Cited

U.S. PATENT DOCUMENTS

| | | | |
|---|---|---|---|
| 2019/0008321 A1* | 1/2019 | Allmendinger | ......... F24B 7/005 |
| 2019/0290064 A1* | 9/2019 | Colston | ................... A47J 37/07 |
| 2020/0375396 A1* | 12/2020 | Rahmani | ............. A47J 37/0786 |
| 2021/0196078 A1* | 7/2021 | Colston | .............. A47J 37/0786 |
| 2022/0257051 A1* | 8/2022 | Colston | ................... F24B 1/028 |

* cited by examiner

*Primary Examiner* — Alfred Basichas
(74) *Attorney, Agent, or Firm* — Fennemore Craig, P.C.

(57) ABSTRACT

A combustion chamber sized to receive a quantity of solid fuel is in fluid communication with a cooking region of a grilling appliance. A control system is operable in at least a smoke mode and a temperature mode. When operated in the smoke mode, the control system operates a fuel delivery system and draft inducer in accordance with predetermined fuel and combustion air delivery schedules. When operated in the temperature mode, the control system operates the fuel delivery system based on a feedback signal derived from the temperature of the cooking region. A user interface operatively associated with the control system allows a user to operate the grilling appliance in either of the smoke mode or the temperature mode.

26 Claims, 16 Drawing Sheets

60

ACTIVATE FUEL DELIVERY AND DRAFT INDUCER SYSTEMS — 73

75

INTERNAL TEMPERATURE>= 130F||PRESENT INTERNAL TEMP-INITIAL INTERNAL TEMP>40F → YES → BACK TO STEP 62

NO

TURN AUGER ON FOR P SEC AND TURN AUGER OFF FOR Q SECS FAN SPEED IS 70%. COUNT ++ — 77

COUNT ==4

ERL (ERROR LOW TEMPERATURES) — 79

70

AUGER OFF, IGNITOR OFF, FAN ON 100% SPEED — 85

87

NO — INTERNAL TEMPERATURE<= 130F || 15 MIN

YES

SHUT DOWN

DUAL MODE SOLID FUEL GRILLING APPLIANCE

TECHNICAL FIELD

The present invention relates to cooking appliances in general and more specifically to solid fuel grilling appliances.

BACKGROUND

Solid fuel cooking appliances, such as grills and smokers, are well-known in the art and are widely used to cook and/or smoke various kinds of foods. Solid fuel grills are typically used to cook foods at higher temperatures and may be fueled by charcoal, wood chips, or pellets, although other fuels may be used. Smokers are typically used to cook foods at much lower temperatures and for longer times, with the required heat and smoke being provided by the burning of the solid fuel. The lower temperatures and slow cooking process of smokers infuses the food with flavors and aromas that are difficult to obtain when cooking at higher temperatures.

SUMMARY OF THE INVENTION

One embodiment of a grilling appliance may include a base and a lid. The lid is operatively associated with the base so that it can be moved between at least an opened position and a closed position. A combustion chamber operatively associated with the base is sized to receive a quantity of solid fuel and includes an outlet that is in fluid communication with a cooking region of the cooking appliance. A fuel delivery system operatively associated with the combustion chamber delivers solid fuel to the combustion chamber. A draft inducer having an air outlet is fluidically connected to a combustion air inlet of the combustion chamber. A temperature sensor operatively associated with the cooking region senses a temperature of the cooking region. A control system operatively connected to the fuel delivery system, the draft inducer, and the temperature sensor is operable in at least a smoke mode and a temperature mode. When operated in the smoke mode, the control system operates the fuel delivery system and the draft inducer so that solid fuel within said combustion chamber is burned in a fuel-rich combustion mode. When operated in the temperature mode, the control system operates the fuel delivery system and the draft inducer so that solid fuel within the combustion chamber is burned in a normal combustion mode. The fuel/combustion air ratio of the normal combustion mode is lower than the fuel/combustion air ratio of the fuel-rich combustion mode. A user interface operatively associated with the control system allows a user to operate the grilling appliance in either of the smoke mode or the temperature mode.

Also disclosed is a method of operating a grilling appliance that may include: Sensing the input of at least one of a smoke mode operation signal or a temperature mode operation signal; if the sensed input is a smoke mode operation signal, then: Operating the fuel delivery system and draft inducer so that solid fuel within the combustion chamber is burned in the fuel-rich combustion mode; and if the sensed input is a temperature mode operation signal, then: Operating the fuel delivery system and the draft inducer so that solid fuel within the combustion chamber is burned in the normal combustion mode.

A non-transitory computer-readable storage medium having computer-executable instructions embodied thereon is disclosed that, when executed by at least one computer processor, cause the processor to: Sense the input of at least one of a smoke mode operation signal or a temperature mode operation signal; if the sensed input is a smoke mode operation signal, then: Operate the fuel delivery system and draft inducer so that solid fuel within the combustion chamber is burned in a fuel-rich combustion mode; and if the sensed input is a temperature mode operation signal, then: Operate the fuel delivery system and the draft inducer so that solid fuel within the combustion chamber is burned in a normal combustion mode.

Also disclosed is a grilling appliance that includes a combustion chamber sized to receive a quantity of solid fuel. An outlet of the combustion chamber is in fluid communication with a cooking region of the grilling appliance. A fuel delivery system operatively associated with the combustion chamber delivers solid fuel to the combustion chamber. A draft inducer delivers combustion air to the combustion chamber. A temperature sensor operatively associated with the cooking region produces an output signal related to the temperature of the cooking region. A control system is operable in at least a smoke mode and a temperature mode. When operated in the smoke mode, the control system operates the fuel delivery system and draft inducer in accordance with predetermined fuel and combustion air delivery schedules. When operated in the temperature mode, the control system operates the fuel delivery system based on a feedback signal derived from the output signal produced by the temperature sensor. A user interface operatively associated with the control system allows a user to operate the grilling appliance in either of the smoke mode or the temperature mode.

Another disclosed method of operating a grilling appliance may include: Sensing the input of at least one of a smoke mode operation signal or a temperature mode operation signal; if the sensed input is a smoke mode operation signal, then: Operating the fuel delivery system and draft inducer of the grilling appliance in accordance with respective predetermined fuel and combustion air delivery schedules; and if the sensed input is a temperature mode operation signal, then: Operating at least the fuel delivery system based on a feedback signal derived from a temperature of a cooking region of the grilling appliance.

Another non-transitory computer-readable storage medium having computer-executable instructions embodied thereon is disclosed that, when executed by at least one computer processor, cause the computer processor to: Sense the input of at least one of a smoke mode operation signal or a temperature mode operation signal; if the sensed input is a smoke mode operation signal, then: Operate the fuel delivery system and draft inducer of a grilling appliance in accordance with respective predetermined fuel and combustion air delivery schedules; and if the sensed input is a temperature mode operation signal, then: Operate the fuel delivery system based on a feedback signal derived from a temperature of a cooking region of the grilling appliance.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
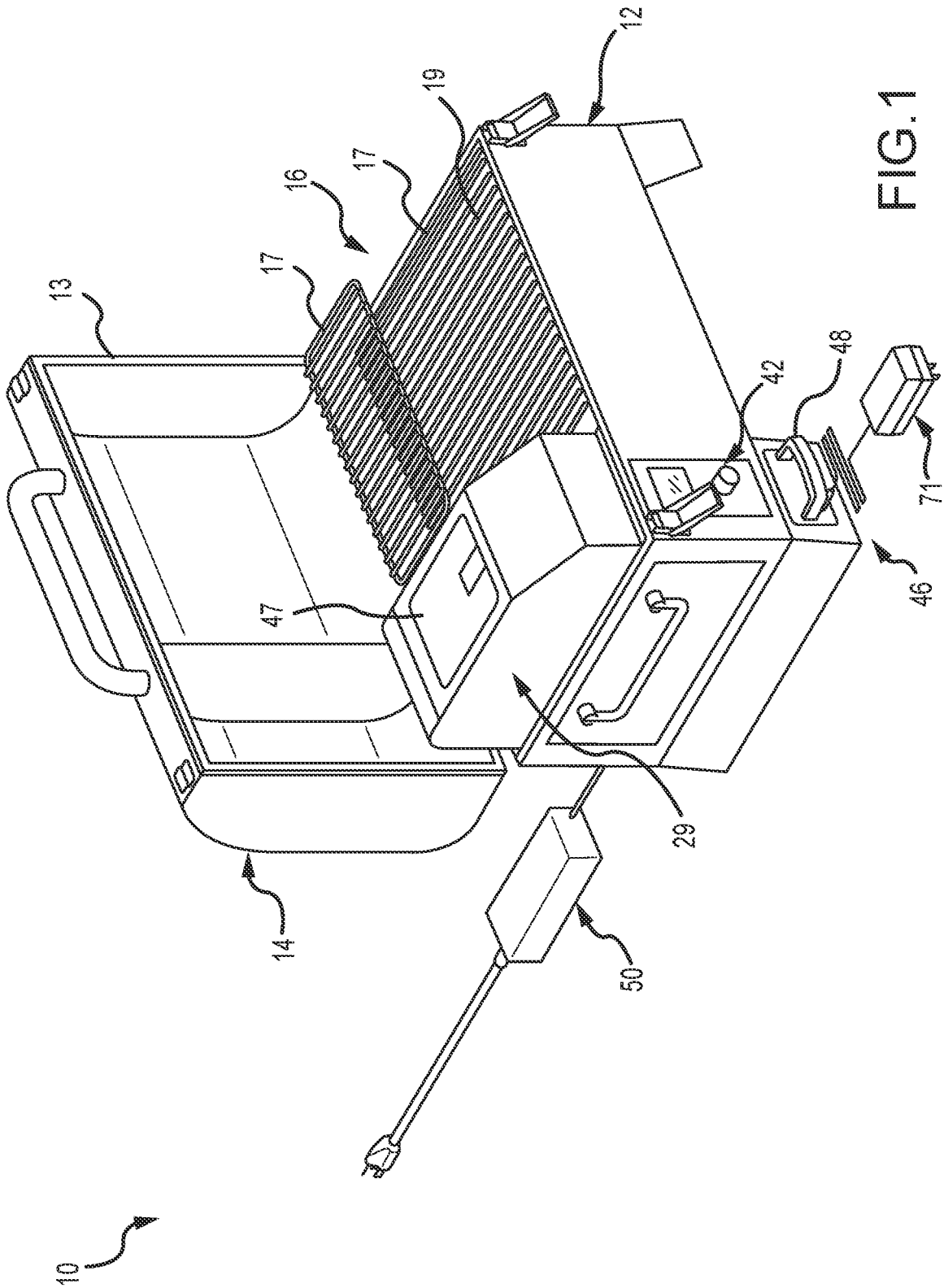
FIG. 1 is a perspective left side view of one embodiment of a dual mode solid fuel grilling appliance according to the teachings provided herein.

One embodiment of a dual mode solid fuel grilling appliance 10 is illustrated in FIGS. 1-13 and may include a base 12 and a lid 14. Lid 14 is mounted to base 12 so that the lid 14 may be moved between an opened position 13, illustrated in FIGS. 1 and 4, and a closed position (not separately shown in FIGS. 1-13). The arrangement is such that a cooking region 16 is defined between base 12 and lid 14 when lid 14 is in the closed position 13. A combustion chamber 20 mounted within base 12 is sized to receive a quantity of a solid fuel 18, such as wood chips or pellets. See FIG. 5. Combustion chamber 20 may be provided with one or more combustion air inlets 22 and one or more outlets 24, as best seen in FIGS. 4-7, 9, and 10. Outlet 24 of combustion chamber 20 is in fluid communication with cooking region 16 so that combustion products (e.g., hot gases and smoke) from solid fuel 18 burning in combustion chamber 20 enter cooking region 16. A fuel delivery system 26 operatively associated with combustion chamber 20 delivers solid fuel 18 to combustion chamber 20 in a manner that will be described in much greater detail herein.

Figure 7:
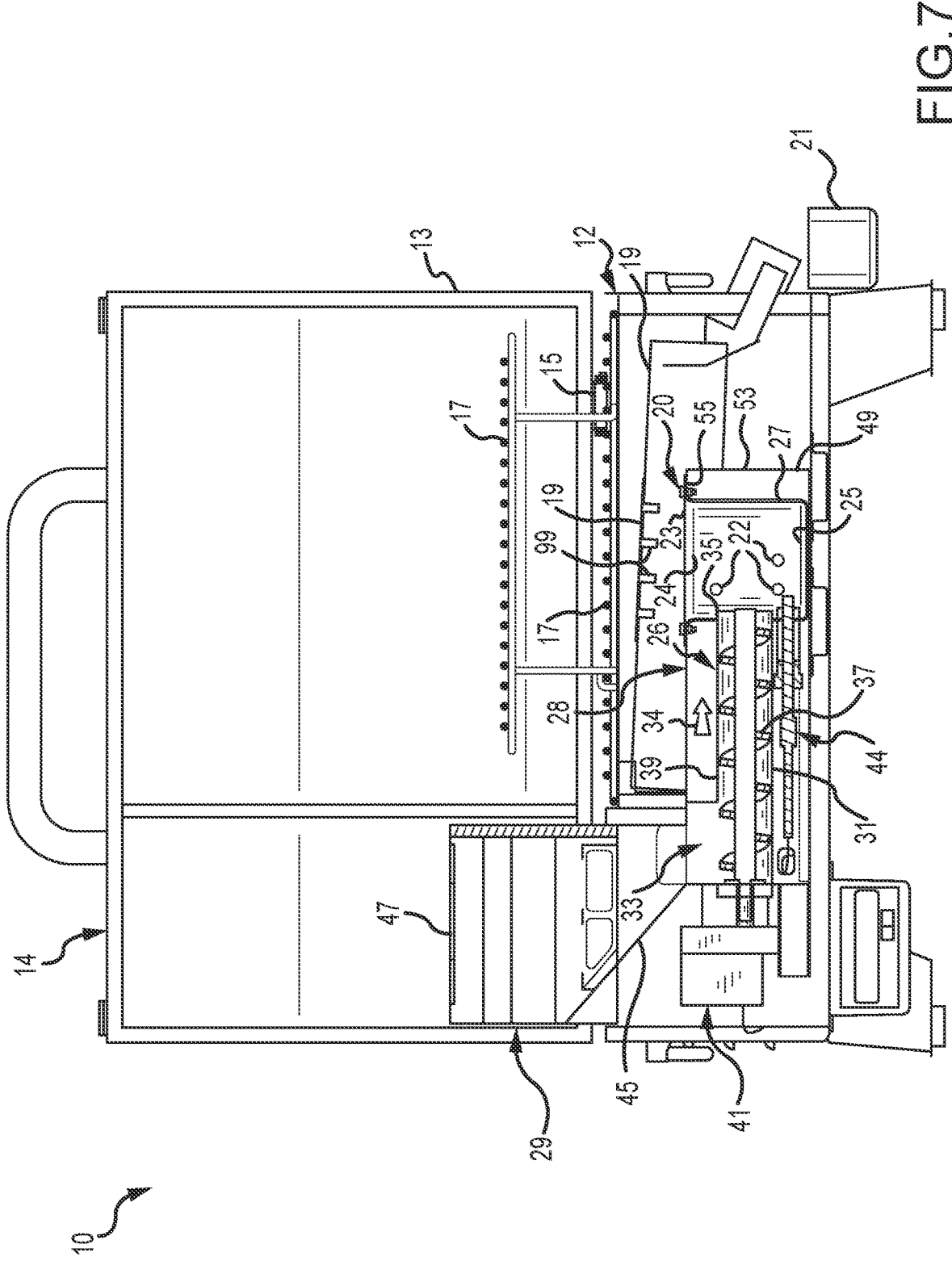
FIG. 7 is a sectional front view in elevation of the grilling appliance illustrated in FIG. 1 showing internal details of the fuel delivery, draft inducer, and ignitor systems.
Figure 8:
FIG. 8 is a sectional top view of grilling appliance illustrated in FIG. 1 showing internal details of the fuel delivery and draft inducer systems.
Figure 9:
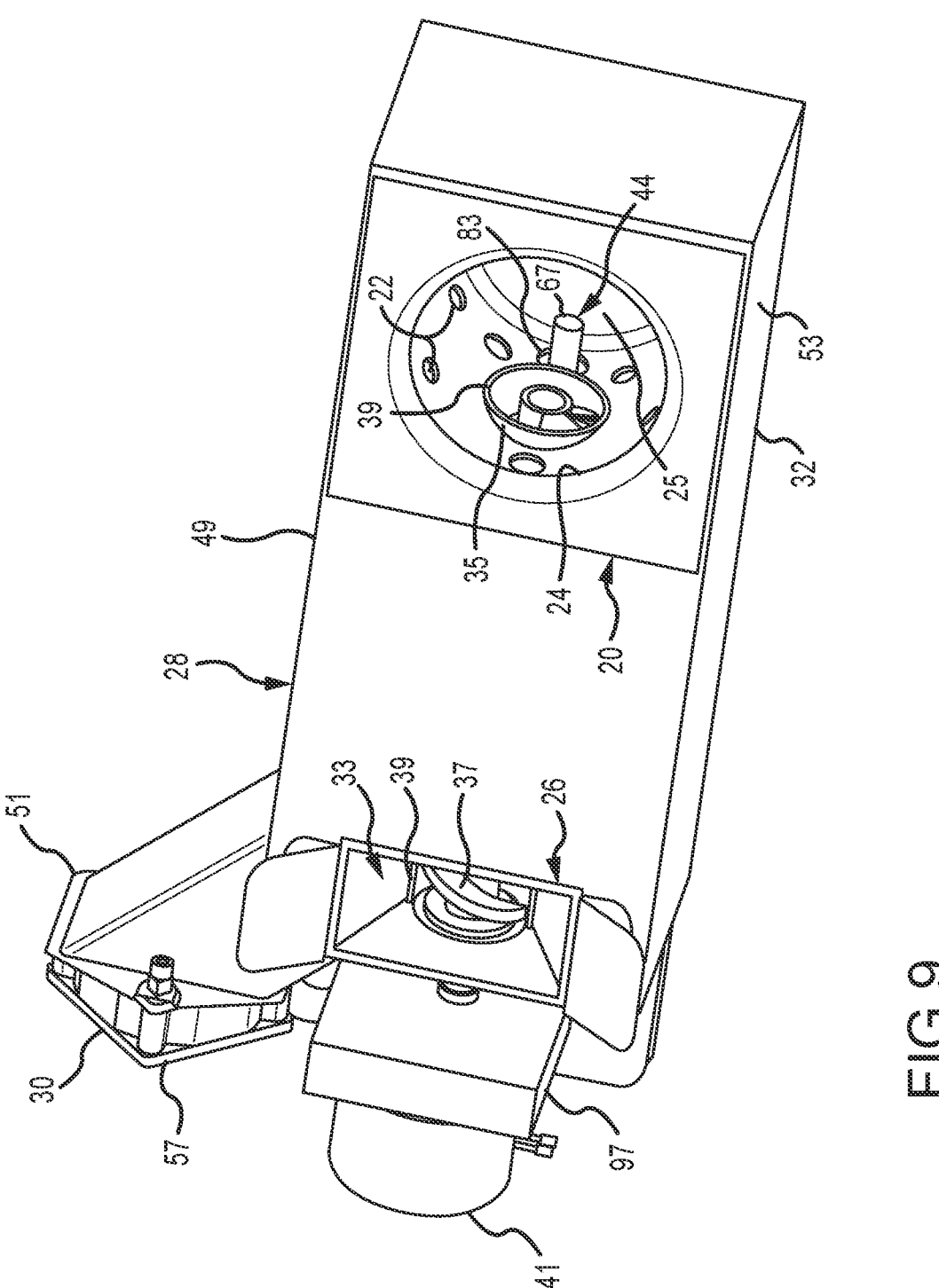
FIG. 9 is an enlarged perspective top side view of the draft inducer, fuel delivery, and ignitor systems of the grilling appliance illustrated in FIG. 1.

Grilling appliance 10 also may be provided with a draft inducer 28. Draft inducer 28 may be provided with an air inlet 30 and an air outlet 32, as best seen in FIGS. 7-9. Air outlet 32 of draft inducer 28 provides combustion air, indicated by arrows 34, to combustion chamber 20. A temperature sensor 36 operatively associated with cooking region 16 provides an output signal 38 that is related to the temperature of cooking region 16. See FIGS. 4 and 6.

Figure 2:
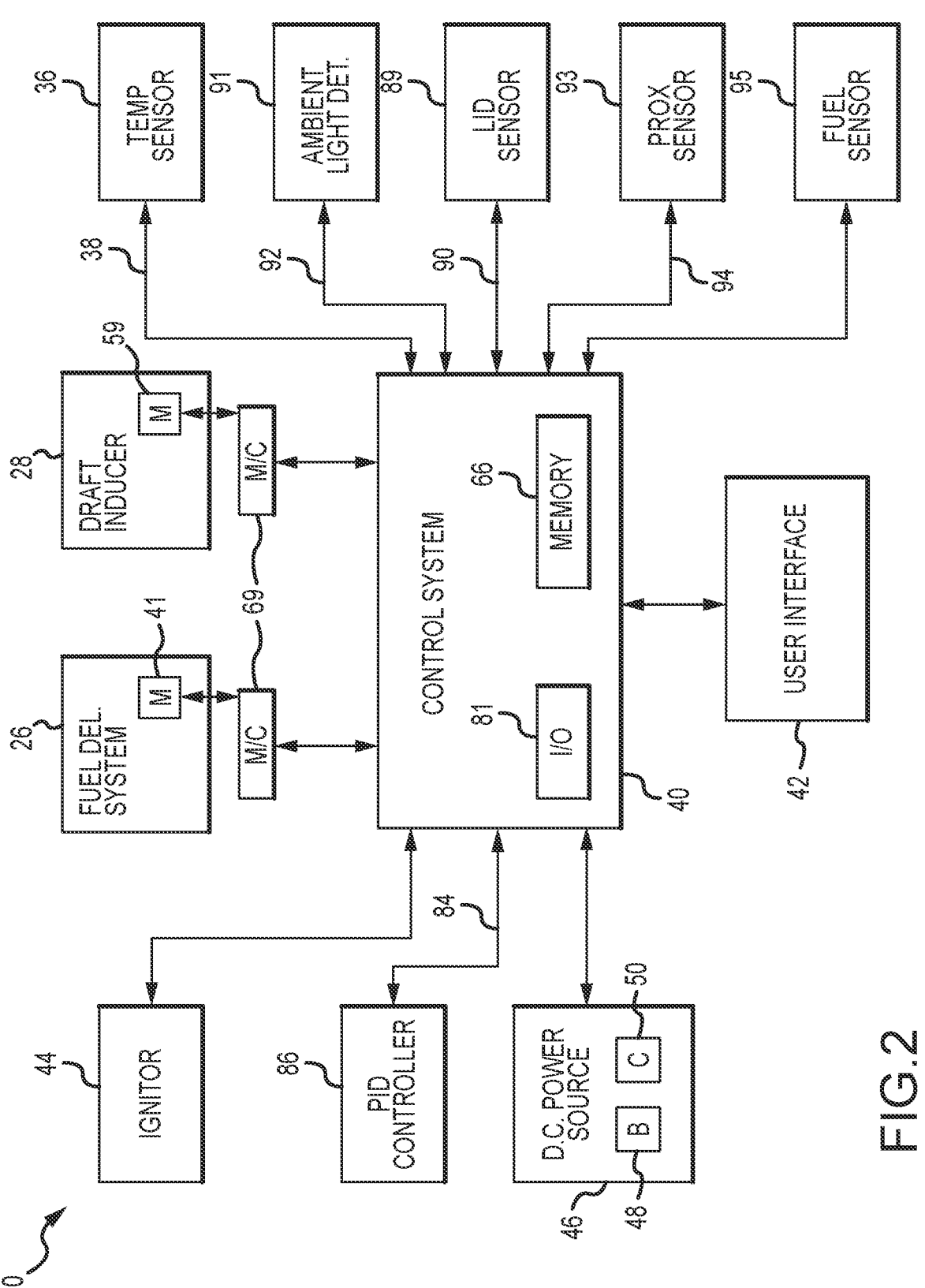
FIG. 2 is a schematic block diagram of the dual mode grilling appliance illustrated in FIG. 1.

Referring now primarily to FIG. 2, dual mode grilling appliance 10 may also comprise a control system 40 and a user interface system 42. Control system 40 may be operatively connected to at least fuel delivery system 26, draft inducer 28, temperature sensor 36, and user interface 42. Control system 40 may be programmed or configured to operate the various systems and devices of grilling appliance 10 in accordance with the descriptions provided herein.

Briefly, and as will be described in much greater detail herein, control system 40 may be operated in at least a 'smoke mode' and a 'temperature mode.' The particular mode of operation may be selected by a user (not shown) via user interface 42. When control system 40 is operated in the smoke mode, control system 40 operates the fuel delivery system 26 and draft inducer 28 so that solid fuel 18 within combustion chamber 20 is burned in a fuel-rich combustion mode. In contrast, when control system 40 is operated in the temperature mode, control system 40 operates at least fuel delivery system 26 so that solid fuel 18 within combustion chamber 20 is burned in a normal combustion mode. The fuel-rich combustion mode generally involves a fuel/combustion air ratio that is numerically higher than the fuel/combustion air ratio of the normal combustion mode. Because the fuel/combustion air ratio of the fuel-rich combustion mode is numerically higher than the fuel/combustion air ratio of the normal combustion mode, operation of the control system 40, thus cooking appliance 10, in the smoke mode will result in the production of greater volumes and/or densities of smoke compared with operation in the temperature mode. The greater volumes/densities of smoke when operated in the smoke mode may be desirable in certain cooking and/or smoking operations.

Grilling appliance 10 also may be provided with an ignitor 44. Ignitor 44 may be connected to control system 40 and is operatively associated with combustion chamber 20. As will be described in greater detail herein, control system 40 may be programmed or configured to selectively energize and de-energize ignitor 44 to ignite and/or maintain combustion of the solid fuel 18 contained within combustion chamber 20. Grilling appliance 10 also may be provided with a source of direct current (dc) power 46, such as a storage battery 48, to operate the various systems and devices comprising grilling appliance 10. Alternatively, and as will be explained in greater detail below, other sources of dc power 46, such as a power converter 50, may be provided, either in addition to, or as a substitute for, storage battery 48.

Figure 3:
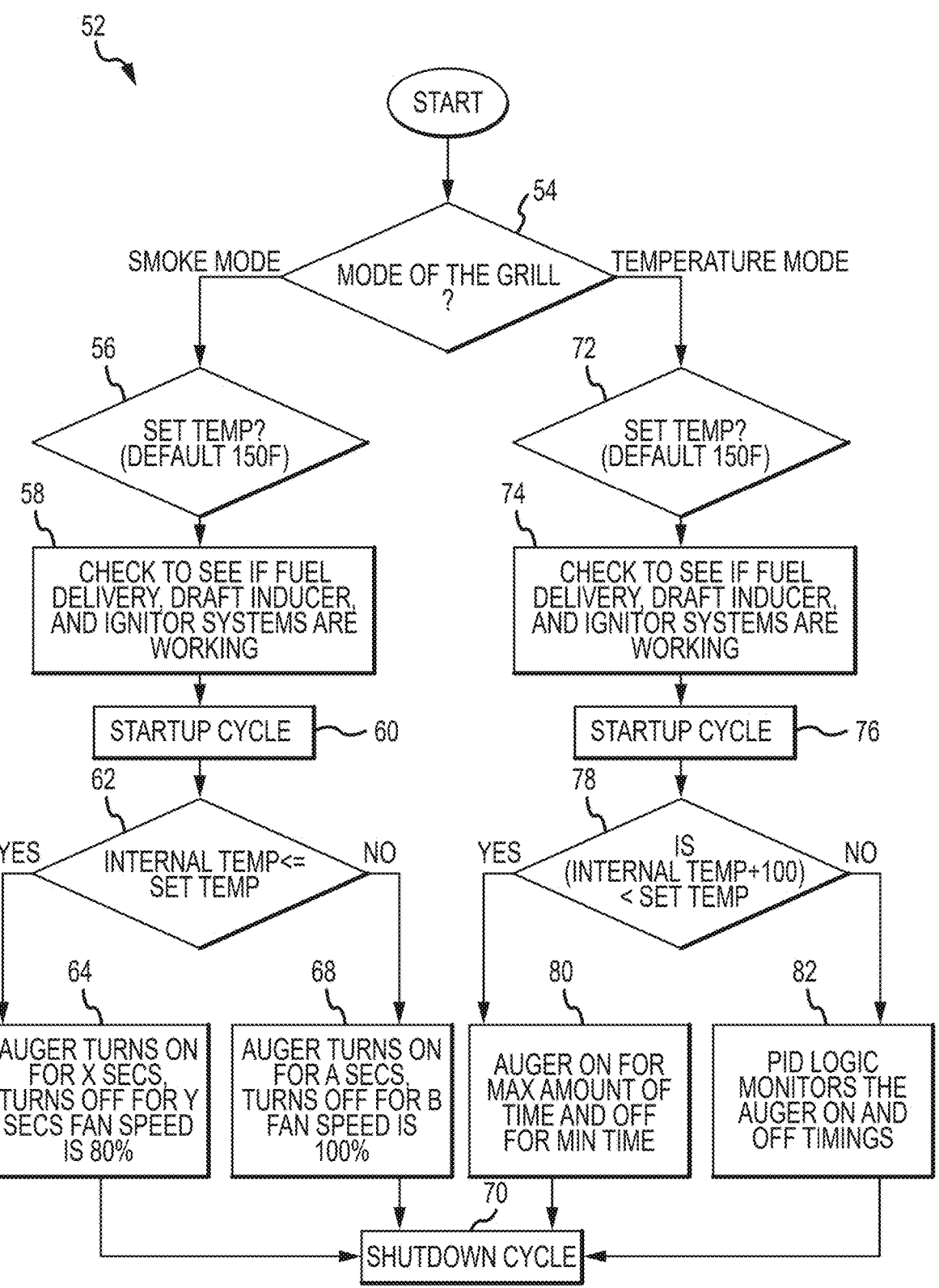
FIG. 3 is a flow chart representation of one embodiment of a method of operating a grilling appliance according to the teachings provided herein.
Figure 4:
FIG. 4 is a perspective top side view of the grilling appliance illustrated in FIG. 1 with certain components removed to reveal internal components thereof.

Referring now primarily to FIG. 3, control system 40 may be configured or programmed to operate in accordance with a method 52 to operate grilling appliance 10 in one of at least the smoke mode and the temperature mode. A first step 54 of method 52 may involve determining whether grilling appliance 10 is to be operated in the smoke mode or the temperature mode. The particular mode may be selected by the user via user interface 42. If the smoke mode is selected, control system 40 then checks, at step 56, whether the user selected or input a desired temperature for the smoke mode. If so, control system 40 regards the user-selected temperature as the 'preset' temperature. If no user input of temperature was detected, control system 40 may be programmed or configured to use a default temperature as the preset temperature.

Control system 40 may then confirm, e.g, at step 58, that certain systems and devices of grilling appliance 10 are fully functional. Those systems and devices may include one or more of the fuel delivery system 26, draft inducer 28, temperature sensor 36, and ignitor 44. Thereafter, control system 40 may initiate a startup cycle 60. During startup cycle 60, control system 40 may activate the fuel delivery system 26, draft inducer 28 and (optionally) ignitor 44 to initiate combustion of solid fuel 18 contained within combustion chamber 20. Control system 40 may confirm ignition of solid fuel 18 by monitoring output signal 38 of temperature sensor 36.

In some operational scenarios, such as when grilling appliance 10 is operated solely from storage battery 48, the user may elect to operate grilling appliance 10 a manual mode. When operated in the manual mode, control system 40 will not activate ignitor 44 during any part of the cooking cycle (e.g., during any step of method 52) in order to reduce the drain on battery 48. Instead, the user will need to manually initiate combustion of solid fuel 18. However, even when operated in manual mode, control system 40 will still operate the other systems and devices of grilling appliance 10, as may be required for operation in either the smoke mode or temperature mode. Control system 40 will simply not operate ignitor 44 if the user has also selected operation in the manual mode.

In any event, and after startup cycle 60 has been completed, control system 40 may continue to monitor output signal 38 of temperature sensor 36 to ascertain the temperature of cooking region 16. If the sensed temperature is less than or equal to the preset temperature, as may be determined in step 62, control system 40 may operate, at step 64, fuel delivery system 26 and draft inducer 28 to deliver a desired amount of solid fuel 18 and combustion air 34 per unit time (i.e., a delivery rate) to combustion chamber 20. In the particular embodiments shown and described herein, control system 40 may deliver the desired amount of solid fuel to combustion chamber 20 by 'pulsing' or operating fuel delivery system 26 on a periodic or 'on-off' basis. The ratio of 'on' time to 'off' time determines the delivery rate of solid fuel 18 over a defined time period (i.e., several on-off cycles). The desired fuel delivery rate may be obtained from a fuel delivery schedule or look-up table stored in memory system 66 (FIG. 2). Control system 40 may provide a desired amount of combustion air 34 per unit time (i.e., a flow rate) to combustion chamber 20 by operating the draft inducer 28 at an appropriate speed. The appropriate speed may be determined from a combustion air delivery schedule or look-up table also stored in memory system 66.

As mentioned above, the quantities, i.e., rates per unit time, of solid fuel 18 and combustion air 34 delivered to combustion chamber 20 during step 64 are selected so that solid fuel 18 within combustion chamber 20 is generally burned in the fuel-rich combustion mode. Burning the solid fuel 18 in the fuel-rich combustion mode will result in the production of greater volumes and/or densities of smoke compared with operation in the temperature mode.

Referring back now to step 62 of method 52, if control system 40 determines that the temperature of cooking region 16 is greater than the set temperature, then control system 40 will proceed to step 68. During step 68, control system 40 may operate fuel delivery system 26 and draft inducer 28 to deliver different amounts of solid fuel 18 and combustion air 34 to combustion chamber 20 in order to reduce the temperature of cooking region 16 until it is at or below the preset temperature. The appropriate amounts (i.e., delivery rates) of solid fuel 18 and combustion air 34 required to reduce the temperature of cooking region 16 may be obtained from the fuel and combustion air delivery schedules stored in memory 66.

In the particular embodiments shown and described herein, the smoke cycle is conducted for a defined time duration, after which control system 40 will perform a shutdown cycle 70. During shutdown cycle 70, control system 40 will deactivate or turn-off fuel delivery system 26 and also ignitor 44 (if ignitor 44 was in use). Control system 40 will then increase the combustion air delivery rate to maximum until the temperature of cooking region 16 is reduced to a defined shutdown temperature or until a defined time period has elapsed.

Referring back now to step 54 of method 52, if the temperature mode is selected (e.g., as determined by user input provided via user interface 42), control system 40 may check, at step 72, whether the user selected or input a desired temperature for the temperature mode. If so, control system 40 regards the user-selected temperature as the 'preset' temperature for the temperature mode. If no user input of temperature was detected, control system 40 may be programmed or configured to use a default temperature as the preset temperature.

Once step 72 has been completed, control system 40 may then confirm, e.g, at step 74, that certain systems and devices of grilling appliance 10 are fully functional. Those systems and devices may include one or more of the fuel delivery system 26, draft inducer 28, temperature sensor 36, and ignitor 44. Thereafter, control system 40 may initiate a startup cycle 76. Startup cycle 76 may be identical to startup cycle 60 described above for operation in the smoke mode.

After startup cycle 76 (which may be identical to startup cycle 60) has been completed, control system 40 may monitor output signal 38 from temperature sensor 36 to ascertain the temperature of cooking region 16. If the sensed temperature plus a 'margin temperature' is less than or equal to the preset temperature, as may be determined in step 78, control system 40 may operate, at step 80, fuel delivery system 26 to deliver solid fuel 18 to combustion chamber 20 at a maximum fuel delivery rate. As will be explained in further detail below, step 80 is performed based on the additive combination of the sensed temperature and the margin temperature in order to increase the stability of operation and reduce temperature fluctuations.

Referring back now to step 78 of method 52, if control system 40 determines that the sensed temperature of cooking region 16 plus the margin temperature exceeds the preset temperature, then control system 40 will proceed to step 82. During step 82, control system 40 may operate fuel delivery system 26 to vary the amount of solid fuel 18 delivered to combustion chamber 20 to reduce the temperature of cooking region 16 until the combined sensed and margin temperatures is lower than the preset temperature. During step 82, the amount of solid fuel 18 delivered to combustion chamber 20 may be varied based on a feedback signal 84. Feedback signal 84 may be derived from the temperature of cooking region 16, e.g., temperature signal 38. In the particular embodiments shown and described herein, the feedback signal 84 may be produced by a proportional-integral-derivative (PID) controller 86 operatively associated with control system 40. See FIG. 2. As will be described in much greater detail below, control system 40 uses feedback signals 84 from PID controller 86 to control at least fuel delivery system 26 to vary the delivery rate of solid fuel 18 to combustion chamber 20 and so maintain the temperature of cooking region 16 within desired bounds.

When operated in the temperature mode, the delivery rate of the solid fuel 18 is such that solid fuel 18 within combustion chamber 20 is predominantly burned in the normal combustion mode. As mentioned above, burning solid fuel 18 in the normal combustion mode will generally result in reduced volumes of smoke and/or densities of smoke compared with operation in the smoke mode. After the temperature mode has been completed, control system 40 may perform shutdown cycle 70.

A significant advantage of the dual mode grilling appliance shown and described herein is that it may automatically (i.e., without additional user intervention) operate the grilling appliance in either the smoke mode or the temperature mode. That is, there is no need for a user to manually control the various parameters (e.g., fuel and combustion air feed rates) in order to achieve satisfactory smoking performance (i.e., when operated in the smoke mode) or satisfactory temperature control (i.e., when operated in the temperature mode). The user need only select the desired mode and temperature via the user interface. Thereafter, the control system will control the various parameters (e.g., fuel and combustion air delivery rates) as necessary to achieve good smoking performance or temperature control.

Other advantages are associated with the fact that the various systems and devices of the grilling appliance are configured to operate from dc power. For example, the grilling appliance may be readily operated from a storage battery, thereby improving portability and flexibility of use as there is no need for the grilling appliance to be plugged into a source of conventional household ac power (e.g., 120 or 240 vac power). The ability to operate the grilling appliance from dc power also allows the grilling appliance to be readily operated (e.g., via an appropriate adapter) from dc power ports or cigarette lighter sockets commonly provided on automobiles, boats, and RVs, without the need for expensive and cumbersome electrical power inverters.

Still other advantages are associated with the manual mode of operation. For example, by disabling the ignitor in the manual mode of operation, the energy drain on the storage battery is greatly reduced, thereby providing the user with extended cooking times over what would otherwise be available if it were not possible to selectively disable the ignitor.

Still yet other advantages are associated with the use of the various fuel and combustion air delivery schedules stored in the memory of the control system. For example, the fuel and combustion air delivery schedules can be specifically developed or tailored for operation during the various steps of the methods disclosed herein, thereby substantially improving the ability of the control system to automatically operate the grilling appliance (e.g., in the startup, smoke or temperature, and shutdown modes) without the need for further user intervention. Moreover, the various fuel and combustion air delivery schedules also can be specifically developed or tailored based on the particular size and configuration of the grilling appliance involved. Therefore, grilling appliances made in accordance with the teachings provided herein will realize improved consistency of performance regardless of the size or configuration of the grilling appliance. Still further, when operated in the smoke mode, the predetermined fuel and combustion air delivery schedules will provide for more consistent and reliable burning of the solid fuel in the fuel-rich combustion mode, thereby enhancing the smoking performance of the grilling appliance.

Still yet further advantages are associated with the use of the PID controller. When operated in the temperature mode, the feedback signal provided by the PID controller improves temperature control and stability within the cooking region. For example if the user opens the lid during operation in the temperature mode, the feedback signal provided by PID controller will allow for more rapid temperature recovery than would otherwise be the case with an open loop control system.

Having briefly described dual mode grilling appliance 10, as well as some of its more significant features and advantages, various embodiments and alternative configurations of the dual mode grilling appliance 10 will now be described in detail. However, before proceeding with the description, it should be noted that while the disclosed systems and methods are described herein as they could be used in conjunction with certain configurations and sizes of grilling appliances and in certain operational scenarios, persons having ordinary skill in the art will readily recognize that the systems and methods described herein could be used in conjunction with a wide range of grilling appliances and operational scenarios. Therefore, the present invention should not be regarded as limited to the particular devices and operational scenarios shown and described herein.

Referring back now primarily to FIGS. 1 and 4-11, a first embodiment 10 of a dual mode solid fuel grilling appliance may comprise a base 12 and a lid 14. Lid 14 may be mounted to base 12 by one or more hinges 15 so that lid 14 may be pivoted with respect to base 12 between opened position 13, illustrated in FIGS. 1 and 4-7, and a closed position (not separately shown for the first embodiment 10). The arrangement is such that a cooking region 16 is defined between base 12 and lid 14 when lid 14 is in the closed position. Generally speaking, grilling appliance 10 will be operated with lid 14 in the closed position, in which case cooking region 16 will be generally closed to the outside environment. Alternatively, grilling appliance 10 also may be operated with lid 14 in the opened position 13.

Grilling appliance 10 may be provided with one or more cooking grates or racks 17 suitable for supporting food items (not shown) to be cooked and/or smoked within grilling appliance 10. Grilling appliance may also be provided with one or more drip pans or shields 19 to collect food drippings and direct them to a suitable collector 21, as best seen in FIG. 7. Drip pans or shield (s) 19 also shield the cooking grates or racks 17 from direct exposure to fuel 18 burning in combustion chamber 20.

Base 12, lid 14, cooking grid(s) 17, drip pans or shield (s) 19, as well as other components of grilling appliance 10 may be fabricated from any of a wide range of materials, such as steel, enameled steel, stainless steel, aluminum, plastic, and various combinations thereof, that are well-known in the art and that would be suitable for the particular application. Therefore grilling appliance 10 and various components thereof should not be regarded as limited to any particular materials.

Of course, grilling appliance 10 may also comprise any of a wide range of other structural features and components not specifically described herein, but which nevertheless may be desired or required for the operation of grilling appliance 10. However, because such other structural features and components could be readily provided by persons having ordinary skill in the art after having become familiar with the teachings provided herein, such other structural features and components that may be provided will not be described in further detail herein.

Grilling appliance 10 may also comprise a combustion chamber 20 provided within base 12. In the particular embodiments shown and described herein, combustion chamber 20 is located at a position below drip shields 19. See FIG. 7. One or more gaps (not separately shown) located between drip shield (s) 19 and base 12 allow combustion products (e.g., hot gases and smoke) from combustion chamber 20 to migrate or flow into cooking region 16. In some embodiments, and as also best seen in FIG. 7, drip shield (s) 19 may define one or more slots or openings 99 therein to further enhance the flow of combustion products to cooking region 16.

Figure 5:
FIG. 5 is a perspective left side view of the grilling appliance illustrated in FIG. 1 with certain components removed to reveal internal components thereof.
Figure 6:
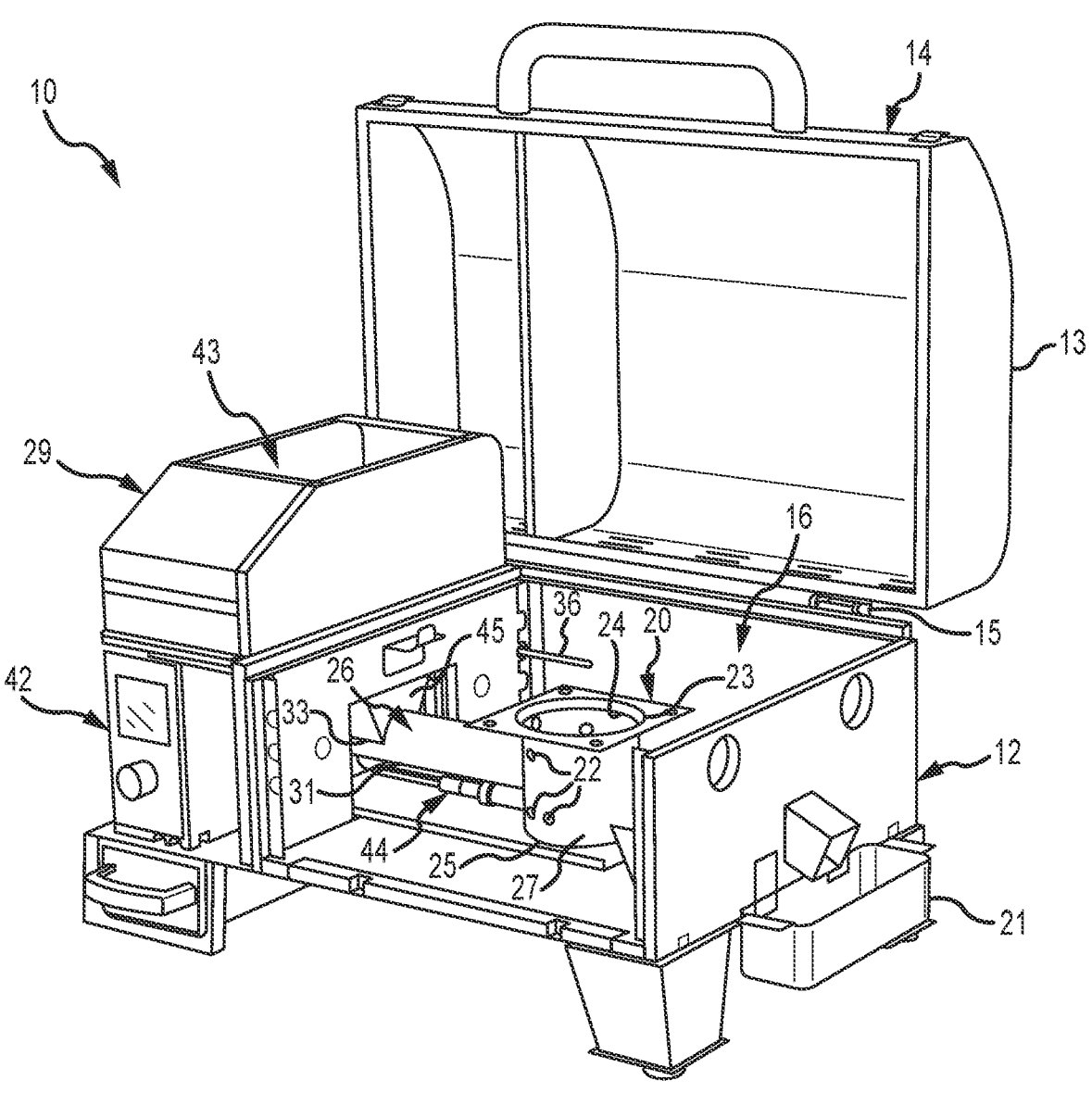
FIG. 6 is a perspective right side view of the grilling appliance illustrated in FIG. 5.

As mentioned earlier, combustion chamber 20 is sized to receive a desired quantity of solid fuel 18 (FIG. 5). Solid fuel 18 may comprise wood chips or pellets, although other types of solid fuel could be used as well. Combustion chamber 20 may be provided with one or more combustion air inlets 22 and one or more outlets 24. Outlet 24 of combustion chamber 20 is in fluid communication with cooking region 16 (e.g., via gaps between drip shield (s) 19 and base 12 and any openings 99 that may be provided in drip shield (s) 19) so that combustion products from solid fuel 18 burning in combustion chamber 20 enter cooking region 16.

With reference now primarily to FIGS. 5, 6, 9, and 10, in the particular embodiments shown and described herein, combustion chamber 20 may comprise a generally cylindrically-shaped member having an open end 23, a closed end 25, and a sidewall 27. Open end 23 may define the outlet 24 of combustion chamber 20. Similarly, side wall 27 defines a plurality of openings therein that form the combustion air inlet 22 of combustion chamber 20. Alternatively, in other embodiments, combustion chamber 20 may comprise other shapes or configurations, as would become apparent to persons having ordinary skill in the art after having become familiar with the teachings provided herein. Consequently, grilling appliance 10 should not be regarded as limited to combustion chambers 20 having any particular shape or configuration.

Combustion chamber 20 may be fabricated from any of a wide range of materials well-known in the art or that may be developed in the future that are or would be suitable for the particular application. Therefore, grilling appliance 10 should not be regarded as limited to combustion chambers 20 fabricated from any particular material. However, by way of example, in one embodiment, combustion chamber is fabricated from a stainless steel alloy.

Grilling appliance 10 may also comprise a fuel delivery system 26. Fuel delivery system 26 may be operatively associated with combustion chamber 20 and delivers solid fuel 18, which may be provided in a fuel storage bin 29, to combustion chamber 20. With reference now primarily to FIGS. 6-10, fuel delivery system 26 may comprise a conveyer system 31 having a fuel intake end 33 and a fuel discharge end 35. Fuel intake end 33 may be coupled to fuel storage bin 29 so that solid fuel 18 stored within fuel storage bin 29 is free to flow into fuel intake end 33 of conveyor system 31. Fuel discharge end 35 of fuel delivery system 26 opens into combustion chamber 20, as best seen in FIGS. 7-9.

Conveyor system 31 of fuel delivery system 26 may comprise a screw-type conveyor system having an auger 37 mounted for rotation within a generally cylindrically-shaped housing 39. A motor 41 connected to auger 37 may be operated by control system 40 to rotate auger 37 in a forward direction and a reverse direction. When auger 37 is rotated in the forward direction, solid fuel 18 is carried from the fuel inlet end 33 to fuel discharge end 35, thereby feeding solid fuel 18 to combustion chamber 20. When auger 37 is operated in the reverse direction, solid fuel 18 is carried from the fuel discharge end 35 to fuel inlet end 33. Operation of auger 37/motor 41 in the reverse direction may be used to clear conveyor system 31 of any jams that may develop during operation.

In some embodiments, jams in conveyor system 31 may be detected by control system 40 based on electrical current drawn by motor 41. If control system 40 senses that motor 41 is drawing excessive current, control system 40 may determine that a jam has occurred. Control system 40 may then operate motor 41/auger 37 in the reverse direction in an attempt to clear the jam. If the attempt is unsuccessful, control system 40 may provide an appropriate error message on user interface 42.

The various components of fuel delivery system 26, including auger 37 and housing 39, may be made from any of a wide range of materials suitable for the particular application. By way of example, auger 37 and housing 39 may be fabricated from stainless steel. Motor 41 may comprise a brushless dc motor of the type that is well-known in the art and readily commercially available. In some embodiments, motor 41 may be provided with a gear reduction system 97 to provide increased torque to auger 37.

Fuel storage bin 29 is best seen in FIGS. 1 and 4-7 and may comprise a generally rectangularly-shaped structure sized to receive a desired quantity of solid fuel 18, although other shapes and configurations may be used. Fuel storage bin 29 may be provided with a loading opening 43 through which solid fuel 18 may be provided to fuel storage bin 29. Fuel storage bin 29 may also be provided with a discharge end 45 through which solid fuel 18 may be fed into fuel intake end 33 of conveyor system 31 of fuel delivery system 26. See FIGS. 6 and 7. If desired, fuel storage bin 29 may be provided with a lid 47 sized to cover loading opening 43, as best seen in FIGS. 1 and 7. The various components of fuel storage bin 29 and lid 47 may be fabricated from stainless steel, although other materials or combinations of materials could also be used.

Referring primarily now to FIGS. 7-10, grilling appliance 10 also may be provided with a draft inducer 28. Draft inducer 28 provides combustion air 34 to combustion chamber 20. In the particular embodiments shown and described herein, draft inducer 28 may comprise a generally rectangularly-shaped plenum 49 having a proximal end 51 and a distal end 53. Proximal end 51 of plenum 49 forms the air inlet 30 of draft inducer 28, whereas distal end 53 of plenum 49 forms the air outlet 32 of draft inducer 28. In the particular embodiment shown and described herein, distal end 53 of plenum 49 may define a circular opening 55 sized to receive combustion chamber 20. See FIG. 7. The arrangement is such that the combustion air inlets 22 of combustion chamber 20 are internal to plenum 49, and thereby receive combustion air 34 flowing in plenum 49, as best seen in FIGS. 7 and 8. A fan assembly 57 and associated motor 59 are mounted to proximal end 51 of plenum 49 (which, again, forms air inlet 30 of draft inducer 28). Motor 59 is operated by control system 40 to provide a flow of combustion air 34 to plenum 49.

In the particular embodiments shown and described herein, plenum 49 is also sized to receive or house at least portions of fuel delivery system 26 and ignitor 44. Not only does the arrangement prevent fuel delivery system 26 from being directly exposed to heat in cooking region 16, but the flow of relatively cool combustion air 34 within plenum 49 further reduces heat transfer to fuel delivery system 26.

Plenum 49 thereby reduces the likelihood that solid fuel 18 within conveyor system 31 will ignite before reaching combustion chamber 20.

The various components of draft inducer 28, including plenum 49, may be fabricated from any of a wide range of materials or combinations of materials that would be suitable for the particular application. By way of example, in one embodiment, plenum 49 may be fabricated from stainless steel. Motor 59 may comprise a brushless dc motor of the type well-known in the art and readily commercially available.

Grilling appliance 10 may also comprise a temperature sensor 36. Temperature sensor 36 may be mounted to base 12 so that a sensing element thereof is disposed within cooking region 16. See FIGS. 4 and 6. As mentioned earlier, temperature sensor 36 produces an output signal 38 (FIG. 2) that is related to the temperature of cooking region 16. Temperature sensor 36 may comprise any of a wide range of temperature sensors that are well-known in the art that would be suitable for use in the intended application. Consequently, temperature sensor 36 will not be described in further detail herein.

Referring now to FIGS. 2 and 5, dual mode grilling appliance 10 may also comprise a control system 40 and a user interface system 42. Control system 40 may be operatively connected to at least motor 41 of fuel delivery system 26, motor 59 of draft inducer 28, temperature sensor 36, user interface 42, and ignitor 44. In some embodiments, dual mode grilling appliance 10 may also comprise a pair of brushless dc motor controllers 69 for controlling motors 41 and 59. Grilling appliance 10 may also comprise a proportional-integral-derivative (PID) controller 86.

Control system 40 may comprise one or more general purpose programmable controllers (e.g., computers) and associated systems, such as memory system 66, input/output (I/O) systems 81, etc., that may be required or desired for the operation of control system 40. However, since control systems suitable for use as control system 40 are well-known in the art and could be readily provided by persons having ordinary skill in the art after having become familiar with the teachings provided herein, the particular control system that may be used in conjunction with the various embodiments of grilling appliance 10 will not be described in further detail herein.

Brushless dc motor controllers 69 may comprise any of a wide range of electronic controllers well-known in the art and readily commercially available that would be suitable for controlling the brushless dc motors 41 and 59 of fuel delivery system 26 and draft inducer 28, respectively. Consequently, the particular brushless dc motor controllers 69 that may be utilized in the various embodiments shown and described herein will not be described in further detail.

PID controller 86 is a feedback control system that is used by control system 40 to regulate or control the temperature of cooking region 16 when operating in the temperature mode. In the particular embodiments shown and described herein, the input to PID controller 86 is the temperature of cooking region 16, e.g., as derived from output signal 38 produced by temperature sensor 36. The feedback signal 84 produced by PID controller 86 is based on proportional, integral, and derivative terms of the cooking region temperature in relation to the desired or preset temperature. Control system 40 uses the feedback signal 84 from PID controller 86 to control the amount of solid fuel 18 delivered to combustion chamber 20, thus regulate the temperature of cooking region 16. In some embodiments, the PID controller 86 may be implemented by control system 40 in the form of an algorithm stored in memory 66. Alternatively, PID controller 86 may be provided as a separate system or device. However, since PID controllers and algorithms are well-known in the art and could be readily provided by persons having ordinary skill in the art after having become familiar with the teachings provided herein, the particular PID controller 86 that may be used in conjunction with control system 40 will not be described in further detail herein.

Figure 11:
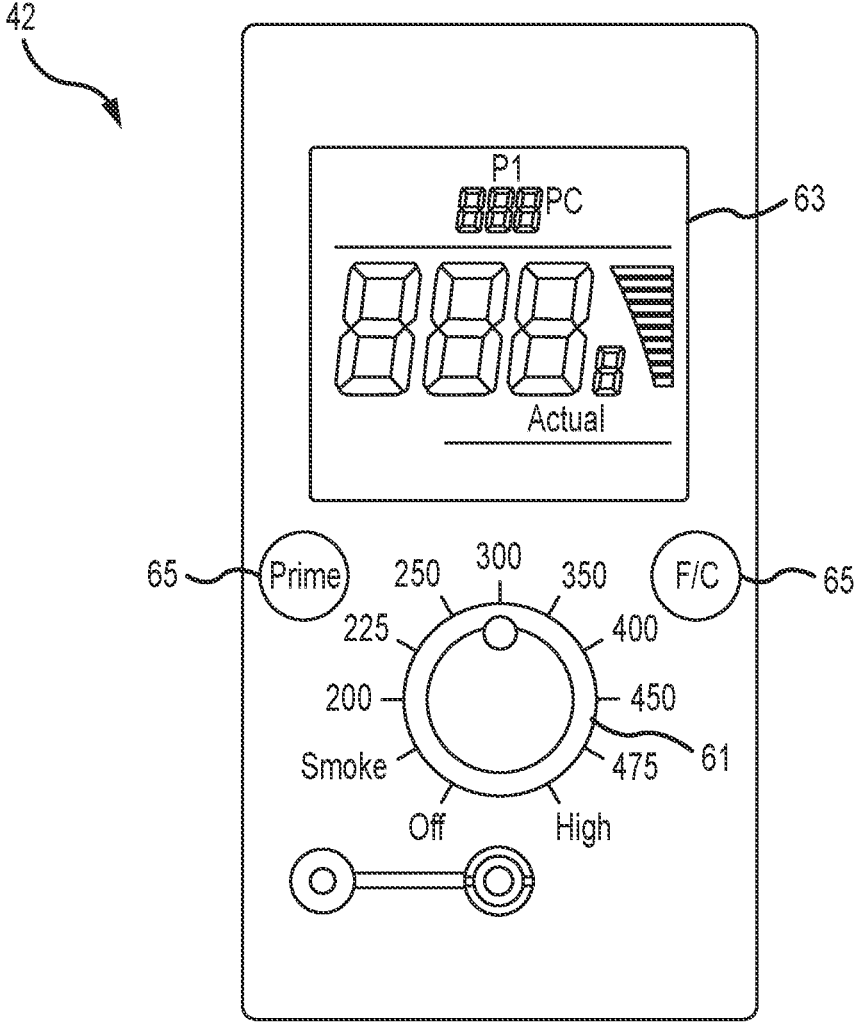
FIG. 11 is an enlarged front view of the user interface system of the grilling appliance illustrated in FIG. 1.

User interface system 42 is operatively connected to control system 40 and allows the user to control certain functions and operations of control system 40. Referring now to FIG. 11, in the particular embodiments shown and described herein, user interface 42 may comprise a user input device, such as a combination rotary encoder/selector knob 61 and a display 63. Rotary encoder/selector knob 61 may allow a user to select a desired temperature as well as to select between at least the smoke mode and the temperature mode. In some embodiments, user interface 42 may also allow the user to select the manual mode (i.e., to prevent control system 40 from activating ignitor 44). Alternatively, in other embodiments a user may select the manual mode by physically disconnecting ignitor 44 from control system 40. Display 63 of user interface system 42 may be configured to indicate the selections made by the user and/or to display the temperature of cooking region 16 (e.g., either the user-selected temperature or the sensed temperature). User interface 42 may also be provided with one or more additional input switches or keys 65 to allow a user to make any additional selections, as may be required or desired for any particular embodiment.

Figure 10:
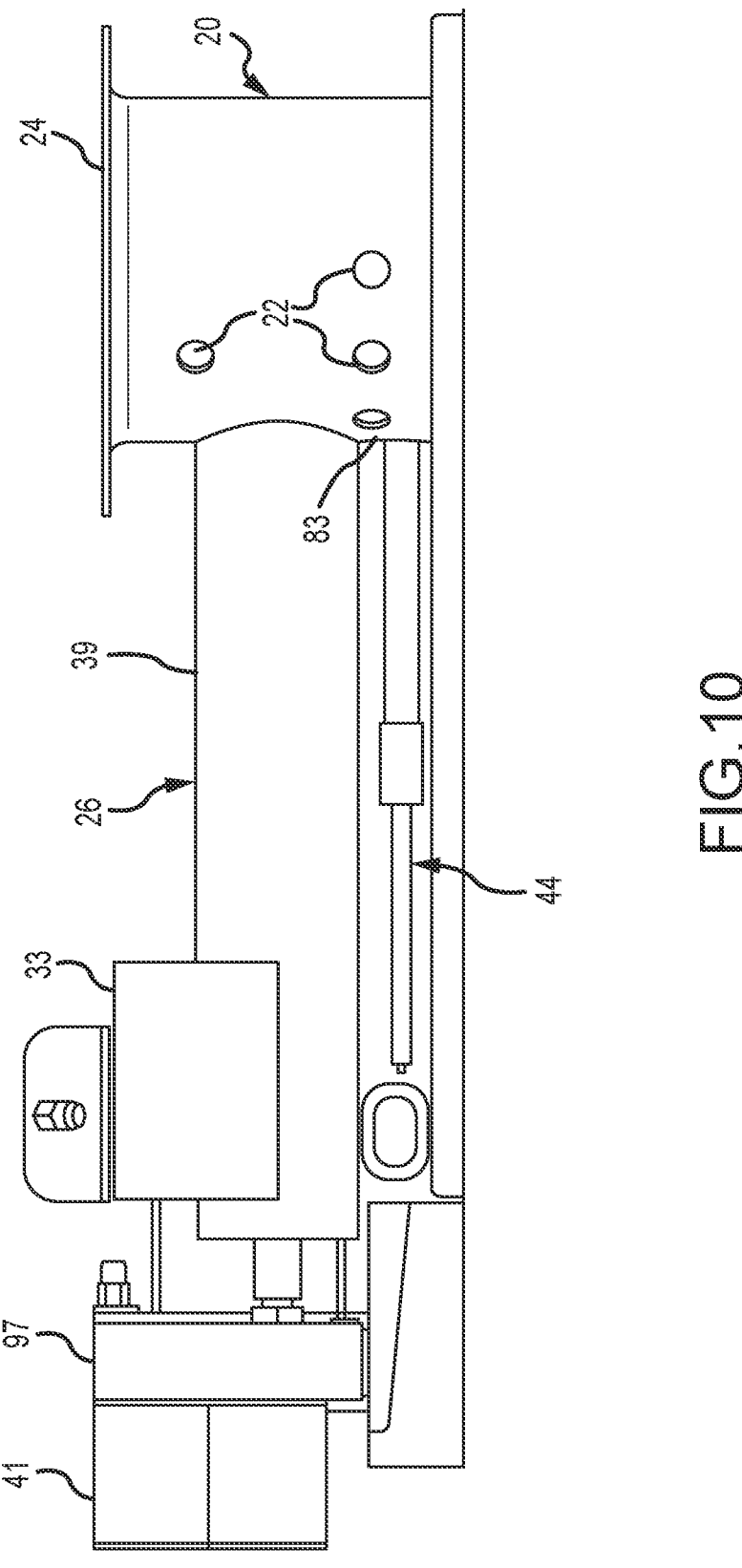
FIG. 10 is an enlarged side view in elevation of the draft inducer, fuel delivery, and ignitor systems illustrated in FIG. 9 with a portion of the plenum of the draft inducer removed to reveal internal details.

As mentioned earlier, grilling appliance 10 also may be provided with an ignitor 44. Ignitor 44 may be connected to control system 40 and is operatively associated with combustion chamber 20, as best seen in FIGS. 7, 9, and 10. When energized (e.g., via control system 40), ignitor 44 provides heat sufficient to initiate combustion of solid fuel 18 contained within combustion chamber 20. In some embodiments, the ignitor 44 is disposed within plenum 49 of draft inducer 28 so that when energized, ignitor 44 heats combustion air 34 flowing within plenum 49 to a temperature sufficient to initiate combustion of solid fuel 18 contained within combustion chamber 20. In other embodiments, ignitor 44 may be operatively associated with combustion chamber 20 so that at least a portion of ignitor 44 is in physical contact with solid fuel 18 provided within combustion chamber 20. In such embodiments, when energized, ignitor 44 directly heats solid fuel 18 within combustion chamber 20 to a temperature sufficient to initiate combustion. In still other embodiments, such as the embodiments illustrated herein, portions of ignitor 44 may be exposed to combustion air 34 within plenum 49, whereas other portions of ignitor 44, such as distal end 67, may be disposed within combustion chamber 20. See FIGS. 7 and 10. In such embodiments, distal end 67 of ignitor 44 directly heats solid fuel 18 provided in combustion chamber 20, whereas the other portions of ignitor 44 heat combustion air 34 flowing in plenum 49. Such heated combustion air 34 may enter combustion chamber 20 through an annulus 83 defined between ignitor 44 and combustion chamber 20.

Ignitor 44 may comprise any of a wide range of ignitors well-known in the art that would be suitable for the particular embodiment. Consequently, the present invention should not be regarded as limited to any particular type of ignitor. However, by way of example, in one embodiment, ignitor 44 may comprise a ceramic (e.g., silicon nitride) ignitor. Alternatively metal ignitors, such as stainless steel ignitors, may also be used.

Grilling appliance 10 also may be provided with a source of direct current (dc) power 46 to provide electrical power sufficient to power the various systems and devices provided therein. In the particular embodiments shown and described herein, the various systems and devices comprising grilling appliance 10 are operable at about 12 volts dc (vdc). Therefore, the source of dc power 46 should supply at least about 12 vdc. In some embodiments, the dc power source 46 may comprise an electrical storage battery 48 mounted to base 12, thereby allowing grilling appliance 10 to be used without an external source of electrical power. If desired, grilling appliance 10 also may be provided with a separate battery charger 71 (FIG. 1) to allow a user to recharge storage battery 48. In some embodiments, storage battery 48 is removable. In the particular embodiments shown and described herein, storage battery 48 may comprise a lithium-ion storage battery having a voltage rating of 12.6 vdc. Alternatively, other types of batteries and battery chemistries could be used.

Alternatively, or in addition to storage battery 48, grilling appliance 10 may be provided with a power converter 50. Power converter 50 converts a source of alternating current (ac) electrical power to direct current electrical power (e.g., 12 vdc) suitable for use by grilling appliance 10. Provision of grilling appliance 10 with power converter 50 will allow grilling appliance 10 to be used with conventional sources of ac power, such as 120 or 220 vac electrical power, even though the various systems and devices of grilling appliance 10 operate at about 12 vdc. In still yet other embodiments, grilling appliance may be provided with a 12 vdc power cord adapter (not shown) configured to be received by 12 vdc 'power ports' or cigarette lighter sockets commonly provided on vehicles, such as automobiles, boats, and RVs. However, since storage batteries, battery chargers, power converters, and dc power cord adapters are well-known in the art and could be readily provided by persons having ordinary skill in the art after having become familiar with the teachings provided herein, the particular storage battery 48, battery charger 71, power converter 50, and dc power cord adapter that may be used in conjunction with the various embodiments of grilling appliance 10 will not be described in further detail herein.

As briefly mentioned earlier, control system 40 may be programmed or configured to allow a user to operate grilling appliance 10 in a manual mode or manual ignition mode, wherein the control system 40 will not activate ignitor 44 during any phase of the selected modes (e.g., smoke mode or temperature mode) or steps of method 52. Instead, the user will need to manually initiate combustion of solid fuel 18. Operation of grilling appliance 10 in the manual ignition mode will reduce the drain on battery 48, which may be desirable when grilling appliance 10 is operated solely from battery 48. Operation in the manual mode may also be advantageous in the case of ignitor issues or in the case of fault ignitors, as the user will still be able to operate grilling appliance 10 until any ignitor issues are resolved.

With reference back now to FIG. 2, some embodiments of grilling appliance 10 may be provided with a lid sensor 89 operatively associated with lid 14 and control system 40. Lid sensor 89 senses or determines the position of lid 14 and produces an output signal 90 relating thereto. Control system 40 may use output signal 90 from lid sensor 89 to assist in controlling the temperature of cooking region 16 (e.g., by increasing the fuel delivery rate when lid 14 is open) or for other purposes. Embodiments of grilling appliance 10 may also be provided with an ambient light sensor 91 operatively associated with control system 40. Ambient light sensor 91 senses an ambient light level and provides an output signal 92 related thereto. Control system 40 may use output signal 92 from ambient light sensor 91 to control various functions and operations of grilling appliance 10, including, for example adjusting the brightness of user interface 42. Control system 40 may also use output signal 92 from ambient light sensor 91 to automatically activate and deactivate one or more grill lamps (not shown). Other embodiments of grilling appliance 10 may also be provided with a proximity sensor 93 operatively associated with control system 40. Proximity sensor 93 may detect the presence of a user or users located nearby grilling appliance 10. Control system 40 may use output signal 94 from proximity sensor 93 to control various functions and operations of grilling appliance 10, including, for example, activating certain aspects of user interface 42 and grill lamps, if provided. In some embodiments, grilling appliance 10 may also be provided with a fuel sensor 95 operatively associated with fuel storage bin 29. Fuel sensor 95 may detect the amount of solid fuel 18 provided in storage bin 29. Control system 40 may then provide an indication on user interface 42 relating to the amount of fuel within storage bin 29.

Control system 40 may be programmed or configured to operate the various systems and devices of grilling appliance 10 in accordance with the methods described herein. The methods may be embodied in software or firmware provided on non-transitory computer-readable storage media, such as memory 66, accessible by control system 40. The software or firmware may comprise computer-executable instructions that, when performed by control system 40, cause control system 40 to control the various systems in accordance with the teachings provided herein.

Figure 12:
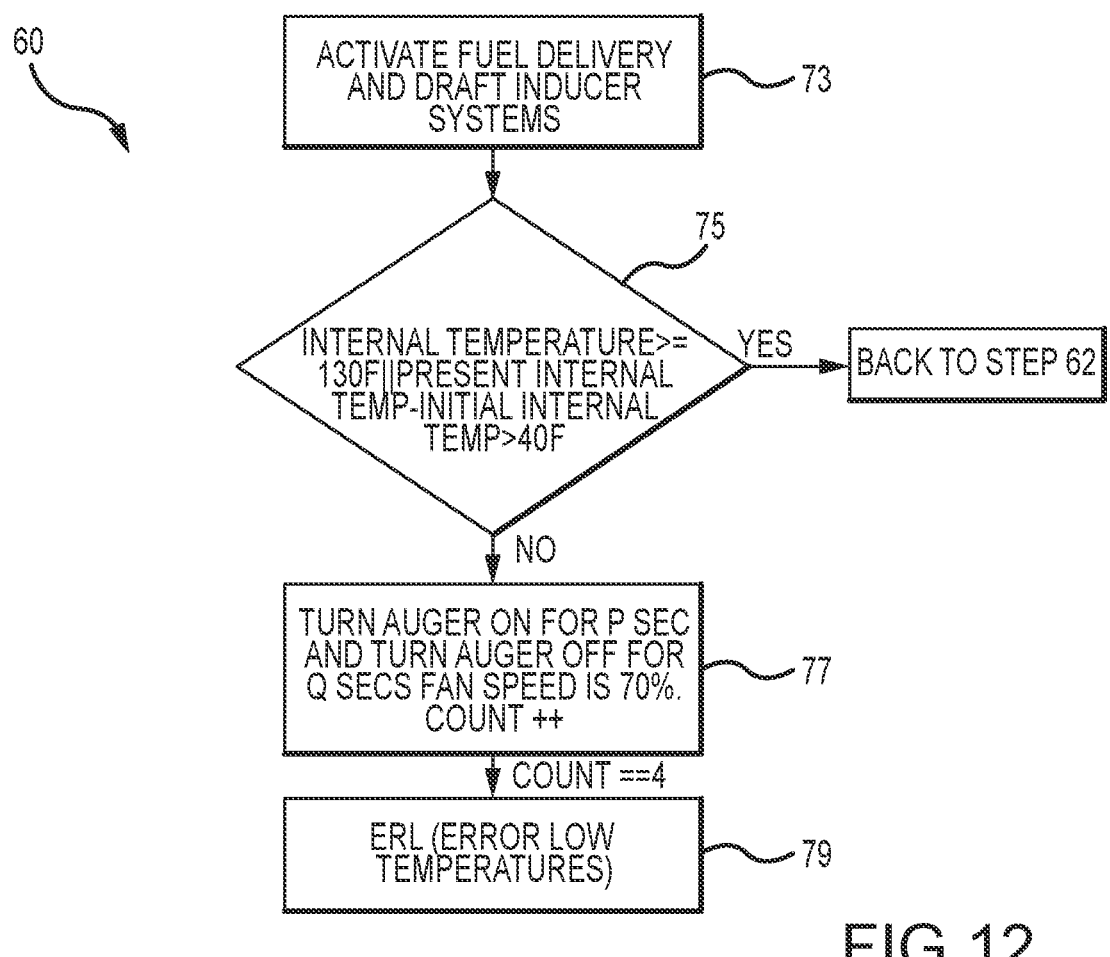
FIG. 12 is a flow chart representation of one embodiment of a startup cycle of the method illustrated in FIG. 3.
Figure 13:
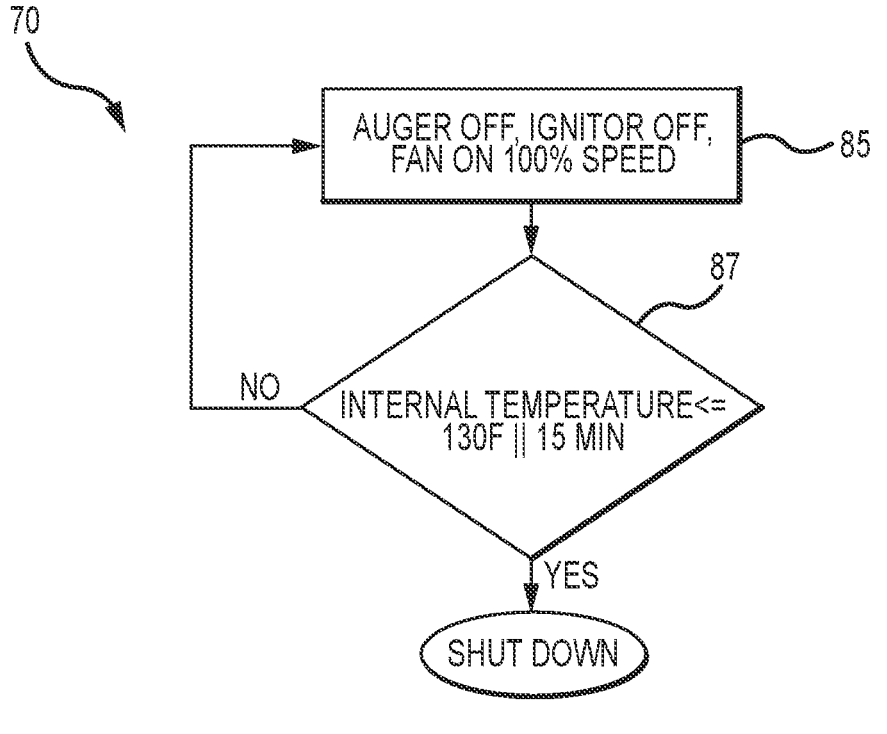
FIG. 13 is a flow chart representation of one embodiment of a shutdown cycle of the method illustrated in FIG. 3.

With reference now primarily to FIGS. 3, 12, and 13, control system 40 may be configured or programmed to operate in accordance with method 52. A first step 54 of method 52 may involve determining whether grilling appliance 10 is to be operated in the smoke mode or the temperature mode. The particular mode may be selected by the user via user interface 42. The selected mode may be determined from signals (not shown) detectable by control system 40. In some embodiments, the default mode may be the temperature mode. If the smoke mode is selected, control system 40 may then determine, at step 56, whether the user selected or input a desired temperature for the smoke mode. If so, control system 40 regards the user-selected temperature as the 'preset' temperature. If no user input of temperature was detected, control system 40 may be programmed or configured to use a default temperature as the preset temperature.

By way of example, in the particular embodiments shown and described herein, the desired temperature selected by the user for the smoke mode may range from about 66° ° C. to about 260° C. (about 150° F. to about 500° F.). Alternatively other temperature ranges may be used. The default temperature may be selected to be about 66° C. (about 150° F.). Alternatively, other default temperatures may be used.

Once step 56 has been completed, control system 40 may then confirm, e.g, at step 58, that certain systems and devices of grilling appliance 10 are fully functional. Those systems and devices may include one or more of the fuel delivery system 26, draft inducer 28, temperature sensor 36, and ignitor 44. Control system 40 may confirm proper operation of such systems and devices by operating them for a short period of time or otherwise cycling the systems and devices in a 'test' mode.

For example, in some embodiments, control system 40 may operate motor 41 of fuel delivery system 26. Proper operation of fuel delivery system 40 may be ascertained by sensing the current draw of motor 41. Alternatively, proper operation may be determined by a suitable feedback signal provided by motor 41 or motor controller 69. Similarly, control system 40 may confirm proper operation of draft inducer 28 by sensing the current draw of motor 59, although proper operation could also be determined from a feedback signal provided by motor 59 or motor controller 69. Proper operation of temperature sensor 36 could be ascertained by sensing the output signal 38 of temperature sensor 36 or by other means, depending on the particular type of temperature sensor 36 that is used. Proper operation of ignitor 44 could be ascertained by measuring the current draw of ignitor 44 when energized. Alternatively, other methods may be used depending on the particular type of ignitor that is provided.

In any event, once control system 40 determines that the various systems and devices are fully functional, control system 40 may then initiate startup cycle 60.

With reference now to FIG. 12, in a first step 73 of startup cycle 60, control system 40 will activate draft inducer 28 and ignitor 44 to initiate combustion of solid fuel 18 provided within combustion chamber 20 (control system 40 will not activate ignitor 44 of the user selected operation in the manual ignition mode). More specifically, control system 40 may operate motor 59 of draft inducer 28 at an appropriate speed to deliver the desired amount of combustion air 34 to combustion chamber 20. The appropriate motor/fan speed may be determined from a combustion air delivery schedule or look-up table stored in memory system 66 (FIG. 2) that is specific to step 73.

Optionally, control system 40 may also operate fuel delivery system 26 during step 73 to ensure that sufficient solid fuel 18 is provided to combustion chamber 20. More specifically, control system 40 may selectively activate and deactivate motor 41 of fuel delivery system 26 to achieve a desired fuel delivery rate for step 73. As mentioned earlier, the ratio of 'on' time to 'off' time of motor 41 determines the amount of solid fuel 18 delivered to combustion chamber 20 over a defined period of time (i.e., over the course of several on-off cycles). The desired fuel delivery rate, i.e., ratio of 'on' time to 'off' time, may be obtained from a fuel delivery schedule or look-up table stored in memory system 66 that is specific to step 73.

A next step 75 of startup cycle 60 involves determining the temperature of cooking region 16. If the temperature of cooking region 16 is determined to be at least about 54° C. (about 130° F.) or if the temperature of the cooking region 16 has increased by at least about 22° C. (about 40° F.) since the startup cycle 60 was initiated, then control system 40 determines that there has been a satisfactory level of combustion of solid fuel 18 within combustion chamber 20. The startup cycle 60 is then complete and the program flow returns to method step 62.

If, on the other hand, the temperature of the cooking region 16 has not increased by the amounts defined in step 75, control system 40 will then proceed to step 77, during which control system 40 will operate fuel delivery system 26 and draft inducer 28 in an attempt to initiate and/or stabilize combustion of the solid fuel 18. More specifically, control system 40 will operate fuel delivery system 26 (e.g., by selectively activating and deactivating motor 41) to achieve a desired fuel delivery rate. The desired fuel delivery rate, i.e., ratio of 'on' time to 'off' time, may be obtained from a fuel delivery schedule or look-up table stored in memory system 66 that is specific to step 77. Also during step 77, control system 40 may operate motor 59 of draft inducer 28 to deliver the desired amount of combustion air 34 to combustion chamber 20. The appropriate motor/fan speed may be determined from a combustion air delivery schedule or look-up table stored in memory system 66 that is also specific to step 77.

Before proceeding with the description, it should be noted that the particular fuel and combustion air delivery rates suitable for the various steps of method 52 may vary depending on the size, capacity, physical configuration, and other particulars of the grilling appliance involved. Suitable fuel and combustion air delivery rates for the various steps of method 52 may be empirically determined for the particular grilling appliance.

Continuing now with the description, if control system 40 is unable to detect an appropriate temperature increase in the cooking region 16 (e.g., as determined in step 75) after performing step 77 for some predetermined number of times (e.g., 4 times), then control system 40 will proceed to step 79, terminate the startup cycle 60, and inform the user (e.g., via user interface 42) that an error has occurred.

If the user has elected to operate grilling appliance 10 in the manual mode (e.g., to conserve battery power), then control system 40 will not activate ignitor 44 during step 73 of startup cycle 60. Instead, the user will need to manually initiate combustion of solid fuel 18. Optionally, during step 73, control system 40 may operate fuel delivery system 26 in accordance with a fuel delivery schedule that is specific to step 73 but when the user has selected operation in the manual mode. In addition, control system 40 may operate draft inducer 28 in accordance with a combustion air delivery schedule that is also specific to step 73, but when operating in the manual ignition mode. The fuel and combustion air delivery schedules specific to operation in the manual mode may be stored in memory system 66.

After startup cycle 60 has been completed, control system 40 may continue to monitor output signal 38 of temperature sensor 36 to ascertain the temperature of cooking region 16. If the sensed temperature is less than or equal to the preset temperature, as may be determined in step 62, control system 40 may operate, at step 64, motor 41 of fuel delivery system 26 and motor 59 of draft inducer 28 to deliver a desired amount of solid fuel 18 and combustion air 34 (FIG. 8) to combustion chamber 20.

As described above, control system 40 may deliver the desired amount of solid fuel to combustion chamber 20 by pulsing or operating motor 41 of fuel delivery system 26 on a periodic or on-off basis, with the ratio of 'on' time to 'off' time determining the delivery rate of solid fuel 18 over a defined time period (i.e., over the course of several on-off cycles). The desired fuel delivery rate may be obtained from a fuel delivery schedule or look-up table stored in memory system 66 that is specific to step 64. In addition, control system 40 may provide the desired amount of combustion air 34 to combustion chamber 20 by operating motor 59 of draft inducer 28 at an appropriate speed. The appropriate motor/fan speed may also be determined from a combustion air delivery schedule or look-up table also stored in memory system 66 that is specific to step 64.

As mentioned above, the quantity or amounts of solid fuel 18 and combustion air 34 delivered to combustion chamber 20 during step 64 (i.e., as embodied in the fuel and combustion air delivery schedules) may be selected so that the solid fuel 18 within combustion chamber 20 is burned in the fuel-rich combustion mode. Burning the solid fuel in the fuel-rich combustion mode will result in the production of greater volumes and/or densities of smoke compared with operation in the temperature mode.

Referring back now to step 62 of method 52, if control system 40 determines that the temperature of cooking region 16 is greater than the set temperature, then control system 40 will proceed to step 68. During step 68, control system 40 may operate motor 41 of fuel delivery system 26 and motor 59 of draft inducer 28 to deliver different amounts of solid fuel 18 and combustion air 34 to combustion chamber 20 in order to reduce the temperature of cooking region 16 until it is at or below the preset temperature. The appropriate amounts of solid fuel 18 and combustion air 34 required to reduce the temperature of cooking region 16 may be obtained from respective fuel and combustion air delivery schedules stored in memory 66 that are specific to step 68.

In the particular embodiments shown and described herein, the smoke cycle is conducted for a defined time duration, after which control system 40 will perform shutdown cycle 70. The defined time duration may be user-selectable or may be a default duration stored in memory 66. In any event, and with reference now to FIG. 13, during a first step 85 of shut down cycle 70, control system 40 will deactivate or turn-off motor 41 of fuel delivery system 26 and ignitor 44 (if ignitor 44 was in use). Control system 40 will also increase the combustion air delivery rate to maximum (i.e., 100%), e.g., by operating motor 59 at full speed. During step 87, control system 40 will monitor the temperature of cooking region 16. Once the temperature of cooking region 16 has decreased to a shutdown temperature of about 54° C. or lower (about 130° F. or lower) or if a defined time period has elapsed (e.g., 15 minutes), then control system 40 will terminate shutdown cycle 70. Alternatively, other temperatures and time periods may be used.

Referring back now to step 54 of method 52, if the temperature mode was selected (e.g., as determined by user input provided via user interface 42), control system 40 may check, at step 72, whether the user selected or input a desired temperature for the temperature mode. If so, control system 40 regards the user-selected temperature as the 'preset' temperature. If no user input of temperature was detected, control system 40 may be programmed or configured to use a default temperature as the preset temperature.

By way of example, in the particular embodiments shown and described herein, the desired temperature selected by the user for the temperature mode may range from about 66° C. to about 260° C. (about 150° F. to about 500° F.). Alternatively, other temperature ranges may be used. The default temperature may be selected to be about 66° C. (about 150° F.), although other default temperatures could be used as well.

Once step 72 is complete, control system 40 may confirm, e.g, at step 74, that certain systems and devices of grilling appliance 10 are fully functional. Those systems and devices may include one or more of the fuel delivery system 26, draft inducer 28, temperature sensor 36, and ignitor 44. Step 74 may be identical to step 58 described above for operation in the smoke mode. Thereafter, control system 40 may initiate a startup cycle 76. Startup cycle 76 may be identical to startup cycle 60 described above for operation in the smoke mode. Alternatively, in some embodiments, startup cycle 76 may differ from startup cycle 60.

After startup cycle 76 has been completed, control system 40 may monitor output signal 38 from temperature sensor 36 to ascertain the temperature of cooking region 16. If the sensed temperature plus a 'margin temperature' is less than or equal to the preset temperature, as may be determined in step 78, control system 40 may operate, at step 80, motor 41 of fuel delivery system 26 to deliver solid fuel 18 to combustion chamber 20 at a maximum fuel delivery rate.

Step 80 is performed based on the additive combination of the sensed temperature and the margin temperature in order to increase the stability and temperature control during operation in the temperature mode. By way of example, in the particular embodiments shown and described herein, the margin temperature is selected to be about 38° C. (about 100° F.). Alternatively, other margin temperatures may be selected, depending on a range of factors, including the physical configuration and cooking characteristics of the particular grilling appliance involved.

Referring back now to step 78 of method 52, if control system 40 determines that the sensed temperature of cooking region 16 plus the margin temperature exceeds the preset temperature, then control system 40 will proceed to step 82. During step 82, control system 40 may operate motor 41 of fuel delivery system 26 to vary the amount of solid fuel 18 delivered to combustion chamber 20 so as to reduce the temperature of cooking region 16 until the sum of the sensed and margin temperatures is lower than the preset temperature. As mentioned earlier, the appropriate amount of solid fuel 18 delivered to combustion chamber 20 during step 82 may be varied based on feedback signal 84 derived from the temperature of the cooking region 16. In the particular embodiments shown and described herein, the feedback signal 84 is produced by proportional-integral-derivative (PID) controller 86 based on output signal 38 from temperature sensor 36. See FIG. 2.

As briefly mentioned above, when operated in the temperature mode, the delivery rate of solid fuel 18 is such that the solid fuel 18 within combustion chamber 20 is generally burned in the normal combustion mode. The normal combustion mode will generally result in reduced volumes of smoke and/or densities of smoke compared with operation in the smoke mode. Stated somewhat differently, when control system 40 is operated in the temperature mode, control of the temperature of the cooking region 16 will be prioritized over smoke generation. After the temperature mode has been completed, control system 40 may perform shutdown cycle 70.

Figure 14:
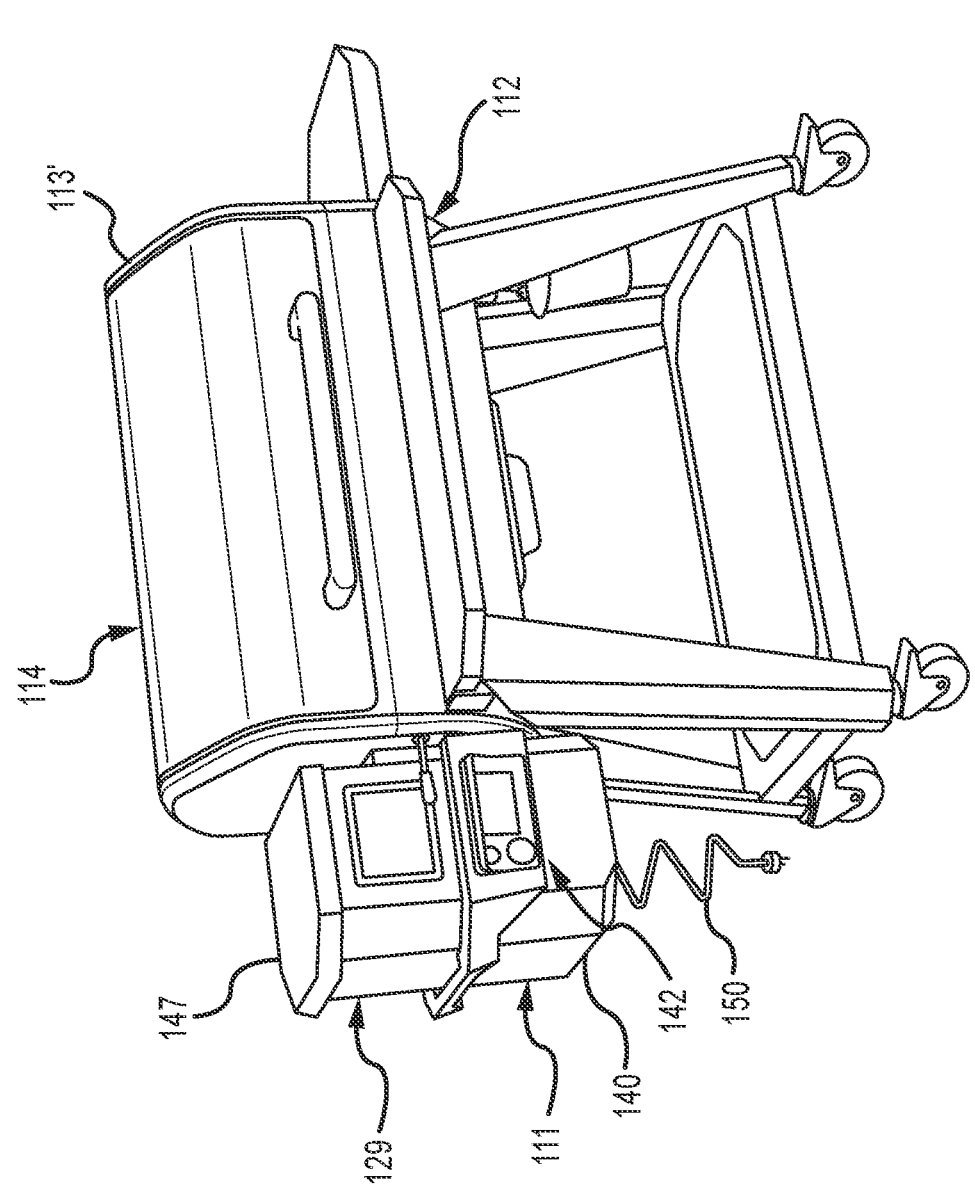
FIG. 14 is a perspective left side view of a second embodiment of a dual mode solid fuel grilling appliance according the teachings provided herein.
Figure 14:
Figure 15:
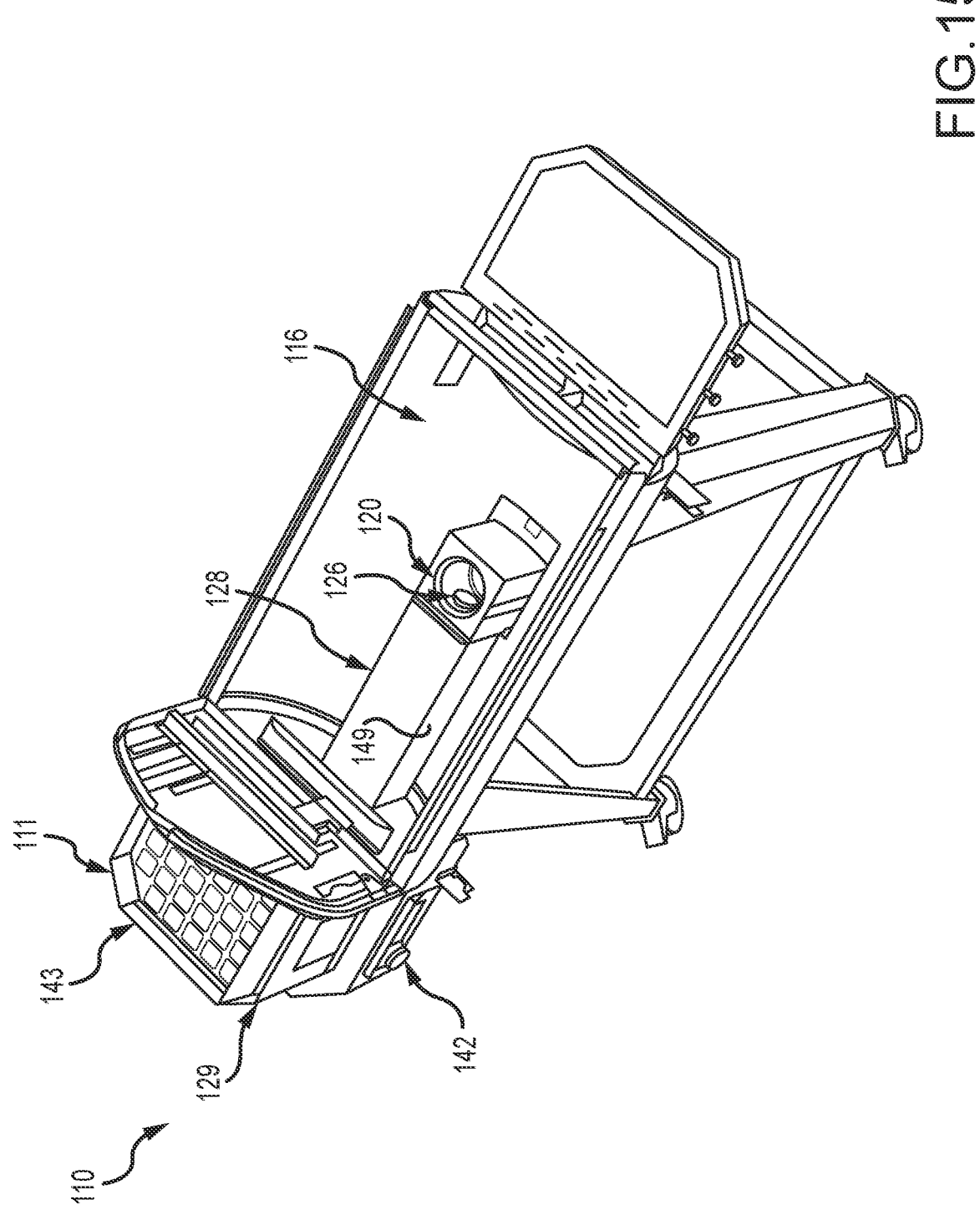
FIG. 15 is a perspective top side view of the grilling appliance illustrated in FIG. 14 with certain components removed to reveal internal components thereof.
Figure 16:
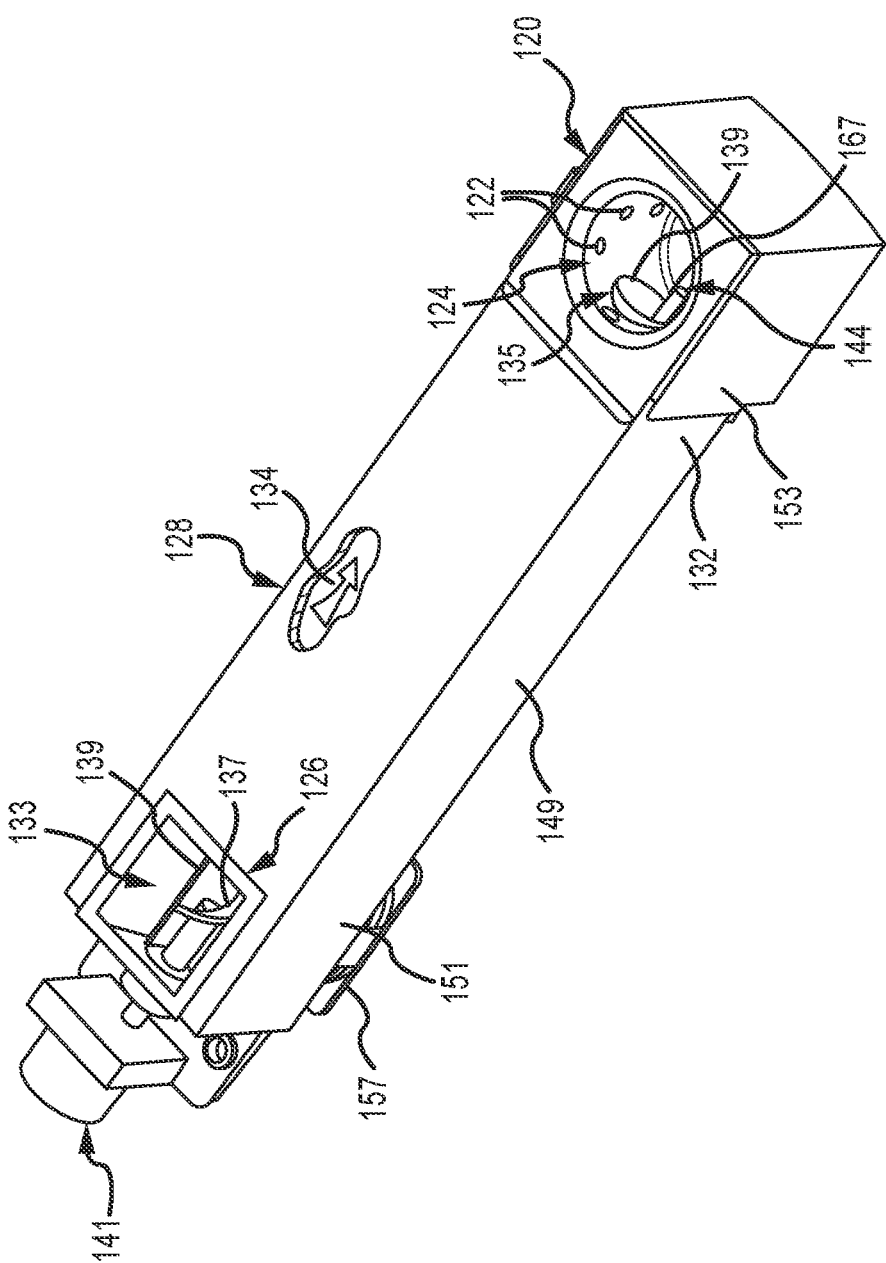
FIG. 16 is an enlarged perspective top side view of the draft inducer, fuel delivery, and ignitor systems of the grilling appliance illustrated in FIG. 14.

A second embodiment of a grilling appliance 110 according to the teachings provided herein is illustrated in FIGS. 14-16. Second embodiment 110 is similar to first embodiment 10, except that the physical size and cooking capacity of the second embodiment 110 of grilling appliance is greater than that of the first embodiment 10. While the various systems and devices of second embodiment 110 are also operated by direct current, second embodiment 110 does not include a storage battery. Instead, second embodiment 110 is provided with a power converter 150 for converting 120 or 240 vac electrical power into dc power suitable for operating grilling appliance 110.

Second embodiment 110 of grilling appliance may comprise a base 112 and a lid 114 that together define a cooking region 116 when lid 114 is in the closed position 113' illustrated in FIG. 14. Grilling appliance 110 may include a side extension 111 mounted to base 112. Side extension 111 may be configured to house a control system 140 and a user interface 142. Control system 140 and user interface 142 may be similar or identical to those comprising first embodiment 10. Side extension 111 may also comprise a fuel storage bin 129 and associated lid 147 for covering a loading opening 143 (FIG. 15) of fuel storage bin 129.

Figure 17:
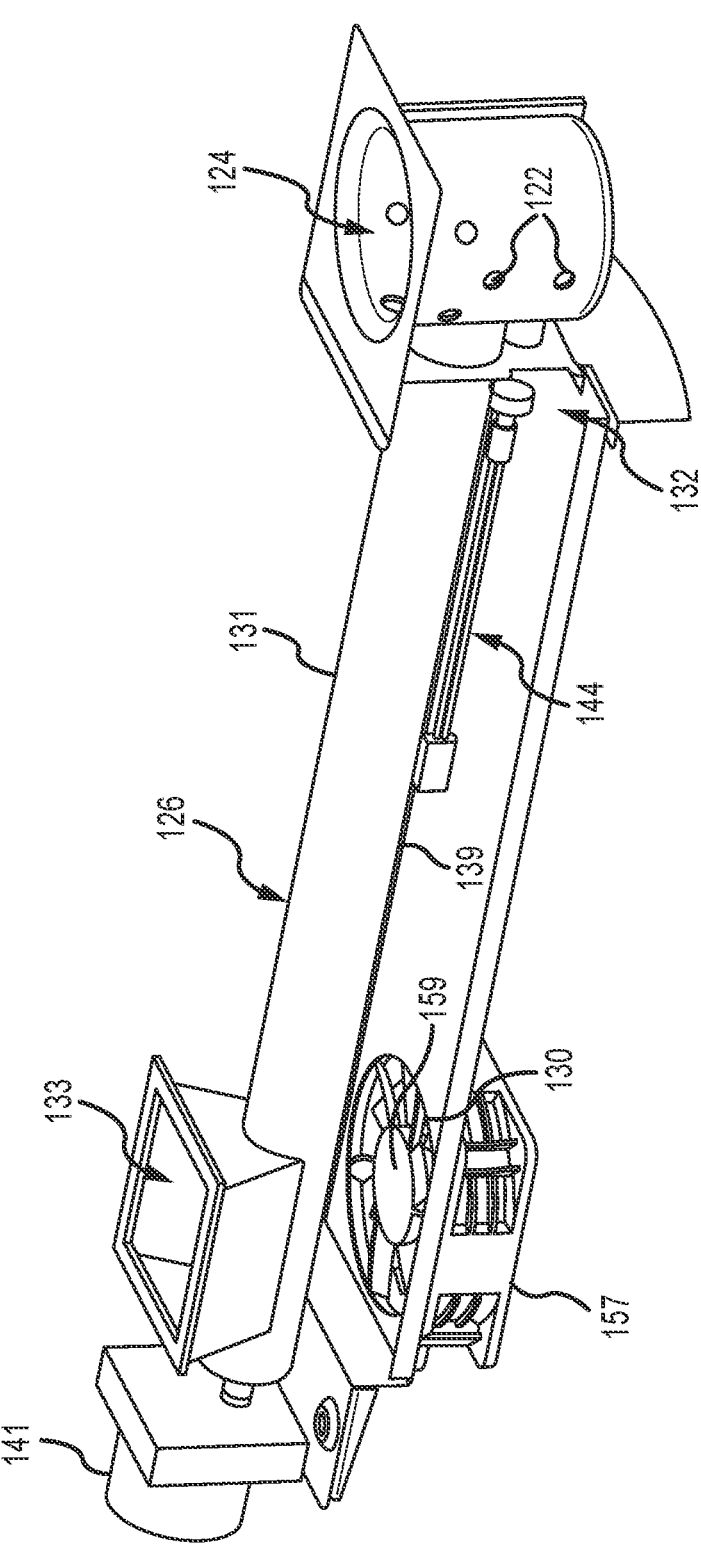
FIG. 17 is an enlarged right side view in perspective of the draft inducer, fuel delivery, and ignitor systems illustrated in FIG. 16 with a portion of the plenum of the draft inducer removed to reveal internal details.

Referring now primarily to FIGS. 15-17, base 112 of second embodiment 110 may include a combustion chamber 120, a fuel delivery system 126, and a draft inducer 128. Combustion chamber 120 may be substantially similar to combustion chamber 20 already described for the first embodiment 10 and may comprise a plurality of combustion air inlets 122 and a combustion air outlet 124. Combustion air outlet 124 is in fluid communication with cooking region 116 so that combustion products from solid fuel (not shown in FIGS. 14-17) burning in combustion chamber 20 enter cooking region 116.

Fuel delivery system 126 is operatively associated with combustion chamber 120 and delivers solid fuel from fuel storage bin 129 to combustion chamber 120. Similar to first embodiment 10, fuel delivery system 126 of second embodiment 110 may comprise a conveyer system 131 having a fuel intake end 133 and a fuel discharge end 135. Fuel intake end 133 may be operatively connected to fuel storage bin 129 so that solid fuel stored therein is free to enter or flow into fuel intake end 133. Fuel discharge end 135 opens into combustion chamber 120, as best seen in FIG. 16. Conveyer system 131 of fuel delivery system 126 may comprise a screw-type conveyor system having an auger 137 mounted for rotation within a generally cylindrically-shaped housing 139. A motor 141 connected to auger 137 may be operated by control system 140 to rotate auger 137 in a forward direction, in which solid fuel is carried from fuel intake end 133 to fuel discharge end 135. Control system 140 may also operate motor 141 in a reverse direction, in which solid fuel is carried from fuel discharge end 135 to fuel intake end 133. As was the case for the first embodiment, operation of motor 141/auger 137 in the reverse direction may be used to clear conveyer system 131 of any jams that may occur during operation. As was the case for the first embodiment 10, motor 141 of second embodiment 110 may comprise a brushless dc motor. Jams may be detected by monitoring the current drawn by motor 141. If the current is excessive, control system 140 may reverse motor 141 in an attempt to clear the jam.

Draft inducer 128 of grilling appliance 110 may comprise a generally rectangularly-shaped plenum 149 having a proximal end 151 and a distal end 153. Proximal end 151 of plenum 149 forms an air inlet 130 of draft inducer 128, whereas distal end 153 of plenum 149 forms an air outlet 132 of draft inducer 129. In contrast to the draft inducer 28 of first embodiment 10, the air inlet 130 of draft inducer 128 (i.e., defined by proximal end 151 of plenum 149) is located on the bottom side of plenum 149, as best seen in FIGS. 16 and 17. As was the case for the first embodiment 10, distal end 153 of plenum 149 is sized to receive combustion chamber 120 so that air inlets 122 of combustion chamber 120 receive combustion air 134 flowing in plenum 149. A fan assembly 157 and associated motor 159 are mounted to proximal end 151 of plenum 149. Motor 159 of draft inducer 128 may comprise a brushless dc motor.

Ignitor 144 of second embodiment 10 may be identical to ignitor 44 for the first embodiment 10 and may be mounted within plenum 149 at a position generally below fuel delivery system 126. Ignitor 144 may be connected to control system 140. When energized, ignitor 144 provides heat sufficient to initiate combustion of solid fuel contained within combustion chamber 120. As was the case for the first embodiment 10, ignitor 144 of second embodiment 110 may be disposed within plenum 149 of draft inducer 128 so that when energized, ignitor 144 heats combustion air 134 flowing within plenum 149 to a temperature sufficient to initiate combustion of solid fuel contained within combustion chamber 20. In the second embodiment 110, distal end 167 of ignitor 144 is disposed within combustion chamber 120 so that distal end 167 of ignitor 144 directly heats solid fuel provided in combustion chamber 20. Other portions of ignitor 144 heat combustion air 134 flowing in plenum 149.

The heated combustion air 134 may pass into combustion chamber 120 through an annulus (not specifically shown) defined between ignitor 144 and combustion chamber 120.

As briefly mentioned above, the second embodiment 110 of grilling appliance may be provided with a power converter system 150. Power converter system 150 converts a source of alternating current (ac) electrical power to direct current (dc) electrical power suitable for operating the various systems and devices of grilling appliance 110. If desired, second embodiment 110 of grilling appliance may also be provided with a storage battery (not shown), similar or identical to storage battery 48 provided for first embodiment 10.

Control system 140 of second embodiment 110 may be programmed to operate in accordance with method 52 described above for the first embodiment 10 to allow grilling appliance 110 to be operated in at least the smoke mode and the temperature mode. Operation in both the smoke mode and the temperature mode may be identical to that already described above for the first embodiment 10, except that the fuel and combustion air delivery schedules for the second embodiment 110 will vary from those of first embodiment 10 due to the larger size and different physical configuration of the second embodiment 110 of grilling appliance.

Unless defined otherwise, all technical and scientific terms used herein have the same meaning as commonly understood by persons having ordinary skill in the art to which the invention pertains. Although any methods and materials similar or equivalent to those described herein can be used in practice for testing of the present invention, the preferred materials and methods are described herein.

In understanding the scope of the present invention, the articles "a" and "an" are used herein to refer to one or to more than one (i.e., to at least one) of the grammatical object of the article. By way of example, "an element" means one element or more than one element. The term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. When referring to a measurable value, such as an amount, a temporal duration, and the like, these terms are meant to encompass variations of at least ±20% or ±10%, more preferably ±5%, even more preferably ±1%, and still more preferably ±0.1% from the specified value, as such variations are appropriate and as would be understood by persons having ordinary skill in the art to which the invention pertains.

As used herein, the terms "processor," "computer," or "computer processor" may include any device, system, or combination thereof capable of executing instructions provided to the processor. A processor may be distributed over a network and may include one or more constituent processors. The term "memory" may include any volatile or non-volatile memory system, or combinations thereof capable of storing instructions to be executed by a processor. Memory may be distributed or local.

Throughout this disclosure, various aspects of the invention may be presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.6, 3, 4, 5, 5.7, and 6. This applies regardless of the breadth of the range.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A grilling appliance, comprising:
a base;
a lid operatively associated with said base, said lid being moveable between at least an opened position and a closed position, said base and said lid defining a cooking region therein when said lid is in the closed position;
a combustion chamber operatively associated with said base, said combustion chamber having a combustion air inlet and an outlet, the outlet of said combustion chamber being in fluid communication with the cooking region, said combustion chamber sized to receive a quantity of solid fuel;
a fuel delivery system operatively associated with said combustion chamber, said fuel delivery system operable to deliver solid fuel to said combustion chamber;
a draft inducer having an air inlet and an air outlet, the air outlet of said draft inducer being fluidically connected to the combustion air inlet of said combustion chamber;
a temperature sensor operatively associated with said cooking region;

a control system operatively connected to said fuel delivery system, said draft inducer, and said temperature sensor, said control system being operable in at least:
a smoke mode, wherein said control system operates said fuel delivery system and said draft inducer so that solid fuel within said combustion chamber is burned in a fuel-rich combustion mode; and
a temperature mode, wherein said control system operates said fuel delivery system so that solid fuel within said combustion chamber is burned in a normal combustion mode, the normal combustion mode having a fuel/combustion air ratio that is lower than a fuel/combustion air ratio of the fuel-rich combustion mode, wherein said control system operates said fuel delivery system based on a preset temperature and an additive combination of a temperature sensed by said temperature sensor and a margin temperature; and
a user interface operatively associated with said control system, said user interface allowing a user to operate said grilling appliance in either of the smoke mode or the temperature mode.

2. The grilling appliance of 1, further comprising an ignitor operatively associated with said combustion chamber, said ignitor being operatively connected to said control system, said control system being operable to energize said ignitor and to de-energize said ignitor.

3. The grilling appliance of claim 2, wherein said user interface allows a user to select a manual ignition mode wherein said control system will not energize said ignitor.

4. The grilling appliance of claim of 3, wherein said ignitor is operatively associated with the air inlet of said combustion chamber so that when energized, said ignitor heats combustion air entering said combustion chamber to a temperature sufficient to initiate combustion of solid fuel contained within said combustion chamber.

5. The grilling appliance of claim 2, wherein said ignitor is operatively associated with said combustion chamber so that when energized, said ignitor directly heats solid fuel contained within said combustion chamber to a temperature sufficient to initiate combustion.

6. The grilling appliance of claim 1, wherein when said control system is operated in the smoke mode, said control system operates said fuel delivery system and said draft inducer based on the temperature sensed by said temperature sensor and the preset temperature.

7. The grilling appliance of claim 2, further comprising a direct current source operatively connected to said control system.

8. The grilling appliance of claim 7, wherein said direct current source comprises at least one of a storage battery and a power converter.

9. The grilling appliance of claim 1, wherein the margin temperature is about 38° C. (about 100° F.).

10. The grilling appliance of claim 1, further comprising a fuel storage bin sized to receive a quantity of solid fuel, said fuel storage bin being operatively connected to said fuel delivery system.

11. The grilling appliance of claim 10, wherein said fuel delivery system comprises a conveyer system having a fuel inlet end and a fuel discharge end, the fuel inlet end of said conveyer system being operatively associated with said fuel storage bin, the fuel discharge end of said conveyer system being operatively associated with a fuel inlet of said burn chamber.

12. The grilling appliance of claim 11, wherein said conveyer system comprises;

an auger mounted for rotation within a housing; and a motor connected to said auger, said motor being operatively connected to said control system, said control system operating said motor in a first rotational direction to rotate said auger in a forward direction, said controller operating said motor in a second rotational direction to rotate said auger in a reverse direction.

13. The grilling appliance of claim 12, wherein said motor of said conveyer system comprises a brushless dc motor and wherein said control system further comprises a brushless dc motor control system.

14. The grilling appliance of claim 1, wherein said draft inducer comprises:

a plenum having a proximal end and a distal end, the proximal end of said plenum defining the air inlet of said draft inducer, the distal end of said plenum defining the air outlet of said draft inducer;

a motor mounted to the proximal end of said plenum; and a fan mounted to said motor, said control system operating said motor to initiate a flow of combustion air from the air inlet to the air outlet.

15. The grilling appliance of claim 14, wherein the motor of said draft inducer comprises a brushless dc motor and wherein said control system further comprises a brushless dc motor control system.

16. The grilling appliance of claim 1, wherein said combustion chamber comprises a generally cylindrically shaped member having an open end, a blind end, and a sidewall, the sidewall defining a plurality of openings therein that define the combustion air inlet of said combustion chamber, the open end defining the outlet of said combustion chamber.

17. The grilling appliance of claim 1, further comprising a PID controller operatively associated with said control system, said control system using signals from said PID controller to operate said fuel delivery system when operating in the temperature mode.

18. The grilling appliance of claim 17, wherein said user input device comprises a selector knob.

19. The grilling appliance of claim 1, wherein said user interface comprises:

a display; and a user input device.

20. The grilling appliance of claim 1, further comprising:

a lid sensor operatively associated with said lid and said control system, said lid sensor determining a position of said lid and producing an output signal related thereto;

an ambient light sensor operatively associated with said control system, said ambient light sensor sensing an ambient light level and producing an output signal related thereto; and a proximity sensor operatively associated with said control system, said proximity sensor detecting the presence of a user adjacent said grilling appliance and producing an output signal related thereto.

21. A method of operating a grilling appliance, comprising:

sensing the input of at least one of a smoke mode operation signal or a temperature mode operation signal;

if the sensed input is a smoke mode operation signal, then:

operating a fuel delivery system and a draft inducer of the grilling appliance so that solid fuel within a combustion chamber is burned in a fuel-rich combustion mode; and if the sensed input is a temperature mode operation signal, then:

24 operating the fuel delivery system of the grilling appliance based on a preset temperature and an additive combination of a sensed temperature and a margin temperature so that solid fuel within the combustion chamber is burned in a normal combustion mode, the normal combustion mode having a fuel/combustion air ratio that is lower than a fuel/combustion air ratio of the fuel-rich combustion mode.

22. A non-transitory computer-readable storage medium having computer-executable instructions embodied thereon that, when executed by at least one computer processor, cause the computer processor to:

sense the input of at least one of a smoke mode operation signal or a temperature mode operation signal;

if the sensed input is a smoke mode operation signal, then:

operate a fuel delivery system and a draft inducer of a grilling appliance so that solid fuel within a combustion chamber is burned in a fuel-rich combustion mode; and if the sensed input is a temperature mode operation signal, then:

operate the fuel delivery system of the grilling appliance based on a preset temperature and an additive combination of a sensed temperature and a margin temperature so that solid fuel within the combustion chamber is burned in a normal combustion mode, the normal combustion mode having a fuel/combustion air ratio that is lower than a fuel/combustion air ratio of the fuel-rich combustion mode.

23. A grilling appliance having at least one cooking region, comprising:

a combustion chamber having a combustion air inlet and an outlet, the outlet of said combustion chamber being in fluid communication with a cooking region of the grilling appliance, said combustion chamber sized to receive a quantity of solid fuel;

a fuel delivery system operatively associated with said combustion chamber, said fuel delivery system operable to deliver solid fuel to said combustion chamber;

a draft inducer having an air inlet and an air outlet, the air outlet of said draft inducer being fluidically connected to the combustion air inlet of said combustion chamber;

a temperature sensor operatively associated with the cooking region, said temperature sensor producing an output signal related to the temperature of the cooking region;

a control system operatively connected to said fuel delivery system, said draft inducer, and said temperature sensor, said control system being operable in at least:

a smoke mode, wherein said control system operates said fuel delivery system and said draft inducer in accordance with predetermined respective fuel and combustion air delivery schedules based on the output signal produced by said temperature sensor and a preset temperature; and a temperature mode, wherein said control system operates said fuel delivery system based on the preset temperature and an additive combination of the output signal produced by said temperature sensor and a margin temperature; and a user interface operatively associated with said control system, said user interface allowing a user to operate said grilling appliance in either of the smoke mode or the temperature mode.

24. The grilling appliance of claim 23, further comprising a proportional-integral-derivative (PID) controller operatively associated with said control system, said PID controller producing a feedback signal for said control system based on the temperature signal produced by said temperature sensor.

25. A method of operating a grilling appliance, comprising:

sensing the input of at least one of a smoke mode operation signal or a temperature mode operation signal;

if the sensed input is a smoke mode operation signal, then:

operating a fuel delivery system and a draft inducer of the grilling appliance in accordance with predetermined respective fuel and combustion air delivery schedules based on a temperature of a cooking region of the grilling appliance and a preset temperature; and if the sensed input is a temperature mode operation signal, then:

operating the fuel delivery system based on the preset temperature and an additive combination of the temperature of the cooking region of the grilling appliance and a margin temperature.

26. A non-transitory computer-readable storage medium having computer-executable instructions embodied thereon that, when executed by at least one computer processor, cause the computer processor to:

sense the input of at least one of a smoke mode operation signal or a temperature mode operation signal;

if the sensed input is a smoke mode operation signal, then:

operate a fuel delivery system and a draft inducer of a grilling appliance in accordance with predetermined respective fuel and combustion air delivery schedules based on a temperature of a cooking region of the grilling appliance and a preset temperature; and if the sensed input is a temperature mode operation signal, then:

operate the fuel delivery system based on the preset temperature and an additive combination of the temperature of a cooking region of the grilling appliance and the margin temperature.

* * * * *